(12) United States Patent
Lingren et al.

(10) Patent No.: US 10,125,854 B2
(45) Date of Patent: Nov. 13, 2018

(54) TORQUE LIMITING SYSTEM

(71) Applicant: Bair-Ling Technologies, LLC, El Cajon, CA (US)

(72) Inventors: Rodric N. Lingren, El Cajon, CA (US); Donald L. Bair, La Mesa, CA (US)

(73) Assignee: Bair-Ling Technologies, LLC, El Cajon, CA (US)

( * ) Notice: Subject to any disclaimer, the term of this patent is extended or adjusted under 35 U.S.C. 154(b) by 324 days.

(21) Appl. No.: 15/022,609

(22) PCT Filed: Sep. 19, 2014

(86) PCT No.: PCT/US2014/056605
§ 371 (c)(1),
(2) Date: Mar. 17, 2016

(87) PCT Pub. No.: WO2015/073118
PCT Pub. Date: May 21, 2015

(65) Prior Publication Data
US 2016/0230866 A1      Aug. 11, 2016

Related U.S. Application Data

(60) Provisional application No. 61/880,178, filed on Sep. 20, 2013, provisional application No. 61/907,386, filed on Nov. 22, 2013, provisional application No. 61/927,111, filed on Jan. 14, 2014.

(51) Int. Cl.
*F16H 48/28*      (2012.01)
*F16D 7/02*      (2006.01)

(52) U.S. Cl.
CPC ............. *F16H 48/28* (2013.01); *F16D 7/021* (2013.01)

(58) Field of Classification Search
None
See application file for complete search history.

(56) References Cited

U.S. PATENT DOCUMENTS

| | | |
|---|---|---|
| 2,785,588 A | 3/1957 | Sampietro |
| 2,983,121 A | 5/1961 | Naas |
| 3,061,386 A | 10/1962 | Dix et al. |
| 3,263,451 A | 8/1966 | Reimer |
| 4,222,246 A | 9/1980 | Rongley |

(Continued)

FOREIGN PATENT DOCUMENTS

| | | |
|---|---|---|
| EP | 0373239 A1 | 6/1990 |
| JP | 2002235661 A | 8/2002 |

*Primary Examiner* — Derek D Knight
(74) *Attorney, Agent, or Firm* — MacMillan, Sobanski & Todd, LLC

(57) ABSTRACT

The present invention relates to torque transfer and torque limiting system technology and applications. This invention relates to providing improved torque limiting systems that employ tolerance rings for controlling transmitting power between a single power-input shaft and one or more power-output shafts, which can protect mechanical equipment and drivetrains from damage by mechanical overload. Relating to motor vehicle differentials, the present invention can control differentiation between two power-output shafts, or drive shafts by providing friction internal to said differential and limit "undesirable" slip or differentiation between wheels, as might occur when one wheel encounters a low-traction condition, providing a limited-slip differential.

17 Claims, 12 Drawing Sheets

(56) References Cited

U.S. PATENT DOCUMENTS

| | | |
|---|---|---|
| 4,776,234 A | 10/1988 | Shea |
| 4,790,683 A | 12/1988 | Cramer, Jr. et al. |
| 4,796,488 A | 1/1989 | Hagin et al. |
| 4,828,423 A | 5/1989 | Cramer, Jr. et al. |
| 4,981,390 A | 1/1991 | Cramer, Jr. et al. |
| 5,383,811 A | 1/1995 | Campbell et al. |
| 5,445,574 A | 8/1995 | Sekiguchi et al. |
| 5,667,332 A | 9/1997 | Lindholm |
| 6,293,889 B1 | 9/2001 | Fett |
| 6,402,655 B1 | 6/2002 | Irwin et al. |
| 6,443,869 B1 | 9/2002 | Schreier |
| 6,805,017 B2 | 10/2004 | Chikaraishi et al. |
| 6,848,534 B2 | 2/2005 | Toyofuku et al. |
| 7,014,009 B2 | 3/2006 | Yamamoto et al. |
| 7,104,893 B2 | 9/2006 | Duchi et al. |
| 7,610,671 B2 | 11/2009 | Watkins et al. |
| 7,635,252 B2 | 12/2009 | Harada |
| 7,658,677 B2 | 2/2010 | Needes et al. |
| 7,682,257 B2 | 3/2010 | Disser et al. |
| 7,763,336 B2 | 7/2010 | Clarke et al. |
| 7,896,750 B2 | 3/2011 | Brunetti et al. |
| 7,922,418 B2 | 4/2011 | Baker et al. |
| 8,186,904 B2 | 5/2012 | Snadden et al. |
| 8,424,184 B2 | 4/2013 | Hughes |
| 8,615,318 B2 | 12/2013 | Bancalari |
| 2002/0070506 A1 | 6/2002 | Krude |
| 2014/0166423 A1 | 6/2014 | Nias et al. |
| 2015/0308511 A1 | 10/2015 | Asakura et al. |

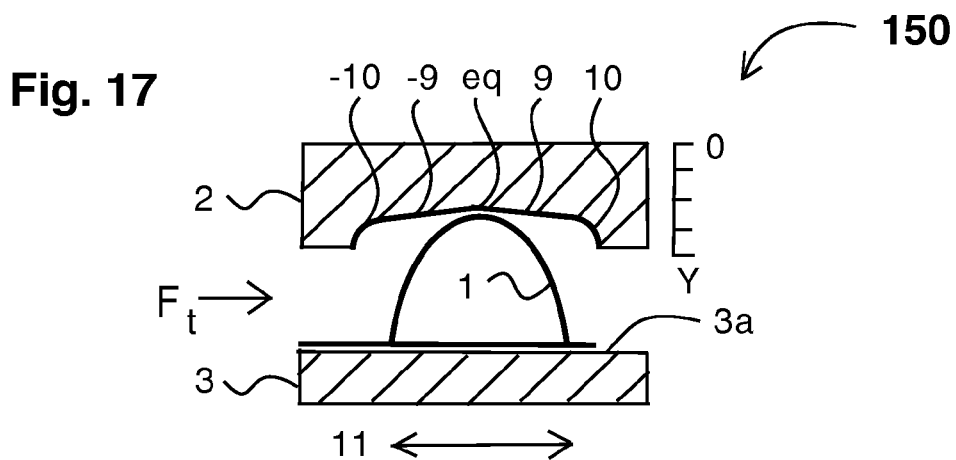
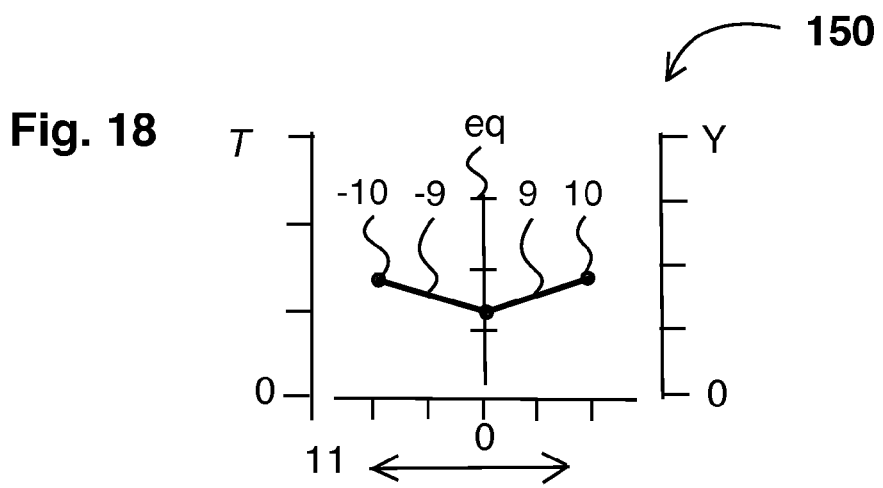
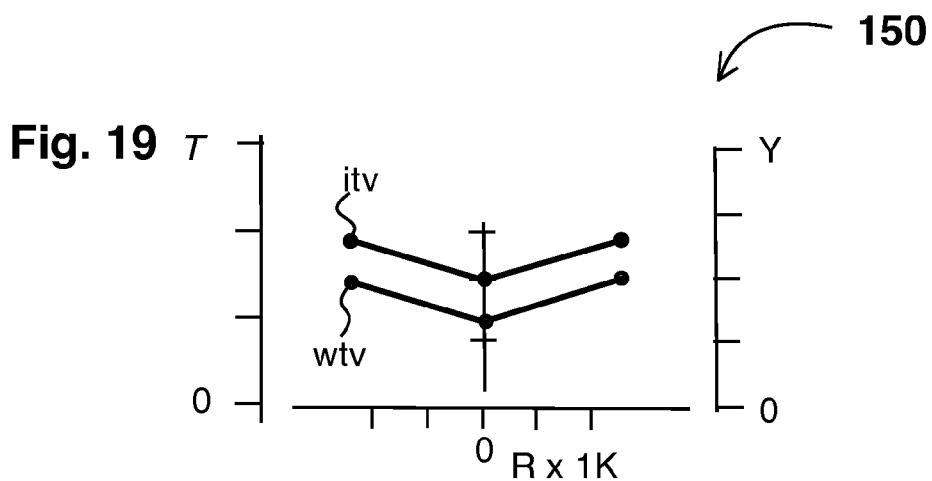

TORQUE LIMITING SYSTEM

CROSS REFERENCE TO RELATED APPLICATIONS

The present application is related to and claims priority from prior provisional application Ser. No. 61/880,178 filed Sep. 20, 2013, entitled "Limited Slip Differential with Tolerance Rings/Circumferential Clutches", 61/907,386, filed Nov. 22, 2013, entitled "Limited Slip Differential with Tolerance Rings", and is related to and claims priority from prior provisional application Ser. No. 61/927,111, filed Jan. 14, 2014, entitled "Mechanical Locking System for Tolerance Rings", the contents of which are incorporated herein by this reference and are not admitted to be prior art with respect to the present invention by the mention in this cross-reference section.

BACKGROUND OF THE INVENTION

1. Field of the Invention

The present invention relates to torque limiting system technology, torque-slip and torque limiting devices and their application to power transmission assemblies. Such torque limiting devices can protect mechanical equipment from damage by mechanical overload and can be used as torque transferring and limiting devices in various assemblies.

2. Description of the Prior Art

Tolerance Rings, known to the art, are devices capable of providing torque transfer, axial retention and radial loading between mating cylindrical components. When a Tolerance Ring is compressively assembled between said mating cylindrical components, each corrugation provides a spring force resulting in friction. The frictional capacity of the tolerance ring is the resultant force of all the corrugations and the coefficient of friction with the mating components.

Tolerance rings, have a number of advantages, such as being inexpensive, light, simple, durable and allowing rapid device assembly however they are limited in their function when a wide range of mating component material types and frictional capacity is desired.

It is known to the art that a differential is a device that can transfer rotational energy from a single power-input source to two power-output shafts or axles. In the instance of a land vehicle, it can allow differentiation when the outside wheel is required to turn further and faster than the inside wheel when a turn is made. However, to control "undesirable" slip or differentiation between wheels, as might occur when one wheel encounters a low-traction condition, such as mud, snow or ice, it is desirable for the motor vehicle differential assembly to include some provision to limit "undesirable" differentiation.

Many known to the art limited slip differentials utilize viscosity, locking devices, torque sensing gear systems, frictional clutch plates or cones, or other means to limit differentiation and are expensive, complex, heavy, and may exhibit high-frictional loading.

OBJECTS AND FEATURES OF THE INVENTION

More particularly, the present invention can relate to industrial torque limiters and limited-slip differentials, for land vehicles, which provide frictional torque to control differentiation. A primary object and feature of the present invention is to provide a system overcoming the above-mentioned problems.

It is a further object and feature of the present invention to provide such a system permitting independent rotation between the two driven axles, or two output shafts in a fashion that employs tolerance rings as simple, durable and cost-effective means of providing fixed, variable, adjustable and active torque limiting assemblies which provide predetermined amounts of torque internal to the differential, that resist the relative motion of the output shafts so as to desirably distribute torque should traction be compromised on one output shaft or drive wheel.

It is a further object and feature of the present invention to provide versatile, simple, durable, inexpensive system of limited slip differentials:

that permits independent rotation between the two driven axles, or output shafts in a fashion that employs tolerance rings for limiting transmission of torque exceeding a predetermined threshold;

that permits independent rotation between the two driven axles, or two output shafts in a fashion that employs tolerance rings for providing a range of frictional torque-slip values varied by the reaction to angular acceleration of the input energy;

that permits independent rotation between the two driven axles, or two output shafts that employs tolerance rings to improve the function of existing for torque sensing and other types limiting limited-slip differentials;

that permits independent rotation between the two driven axles, or two output shafts in a fashion that employs tolerance rings as simple, durable and cost-effective means of increasing versatility and functionality of torque limiters and limited-slip differentials in automotive and industrial drive lines;

that permits independent rotation between the two driven axles, or two output shafts while imparting a minimum of frictional loading on the power source;

that permits independent rotation between the two driven axles, or two output shafts in a fashion that provides long service life;

that permits independent rotation between the two driven axles, or two output shafts in a fashion that allows for adjustment of the torque limit as a function of one or more parameters.

that employs tolerance rings, which function durably and consistently in the elastic range of their material;

that has configurations of axial grooves which can provide increases or decreases in frictional torque; or that employs tolerance rings with fixed, variable, adjustable and active torque-slip values and can durably function under continuous torque-slip working conditions.

It is a further object and feature of the present invention to provide a system having axial grooves which provide mechanical forces that can hold said corrugations in said grooves, and prevent the rotation of the tolerance rings corrugations against a circumferential component.

Notably said grooves can allow said tolerance ring to function reliably at a much wider and previously unavailable ranges of fixed and variable torque-slip values because spring force and friction is not required to prevent destructive rotation of said tolerance ring.

Other object and features of this invention will become apparent with reference to the following descriptions.

BRIEF DESCRIPTION OF THE DRAWINGS

The drawings described herein are for illustrative purposes only of selected aspects of the present teachings and not all possible implementations, and are not intended to limit the scope of the present teachings. It is also understood that all figures can be exaggerated for clarity.

FIG. 1 shows an externally corrugated tolerance ring in exploded perspective view relating to a prior art assembly.

FIG. 17 shows a fractional sectional schematic view of one corrugation of an externally corrugated tolerance ring of a bi-directional, variable by reaction to angular acceleration torque limiter.

FIG. 18 shows a graph, relating to the performance envelope of a, bi-directional variable by reaction to angular acceleration torque limiter.

FIG. 19 shows a graph, relating to the installed and working torque values of a, bi-directional variable by reaction to angular acceleration torque limiter.

Figure 1:
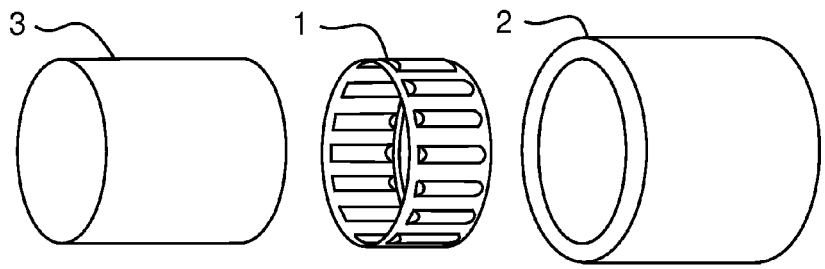

DETAILED DESCRIPTION OF THE BEST MODES AND PREFERRED EMBODIMENTS OF THE INVENTION

The following description is provided to enable any person skilled in the art to make and use the present invention and sets forth the best modes contemplated by the inventors of carrying out their invention. Various modifications, however, will remain readily apparent to those skilled in the art, since the generic principles of the present invention have been defined herein specifically to provide a Torque Limiting System.

Here, we describe a novel inventive combination of torque limiters using tolerance rings that can be used as industrial torque limiters and be applied to open differentials, to limit differentiation.

There are two basic types of automotive differential, the Standard or "open" and Limited-slip type differentials. Both are well known to the art and they have the benefit of many years of development. Both are very simple in their function. The first is transmitting power from a single power source to two driven axles, or output shafts. The second is permitting independent rotation, or differentiation between the two driven axles, or output shafts. Said differentiation occurs when, for example, a land vehicle turns and the outside wheel must travel further and turn faster than the inside wheel.

An "open" differential works well in most situations. However differences in traction between driven road wheels, as in when one wheel is on mud or ice, can cause that driven road wheel to slip, not provide traction. This is because the "open" differential accommodates nearly unlimited differentiation and can send most of the output power to the wheel with the least traction, impairing the vehicle's movement.

Limited-slip differentials are well known to the art and can be relatively large, heavy, expensive and complex. However they are still very simple in their function. They, by various means, limit differentiation to provide motive force in traction compromised situations. They are a desirable option in all types of vehicles for both safety and performance but their expense precludes them from being a standard feature.

Many existing industrial torque limiters are complex, large, heavy and expensive. Tolerance rings are known to the art and provide simple, inexpensive torque transfer and limitation. Said tolerance rings have two sides, a corrugated side and a smooth side and can be made of, but are not limited to, resilient metal or plastic having a split or segmented ring configuration, of varying diameters, having a plurality of circumferentially arranged external or internal corrugations in single or multiple rows, of uniform or varying height and pitch and having a pair of smooth circumferential side rims. Torque limiting assemblies using tolerance rings, limit the maximum amount of torque than can be transmitted between parts of an assembly. When the tolerance ring is compressively located in the annular space between, for example, a shaft and a bore, the corrugations are compressed. Each corrugation acts as a spring and exerts a radial force against the shaft and the surface of the bore, providing a predetermined amount of frictional torque. Preferably there is a linear relationship between compression and friction that determines torque value. Rotation of the housing or the shaft will transmit similar rotation in the other of the shaft or the housing. If said rotational forces are applied such that the input torque is higher than a predetermined threshold value, one will rotate relative to the other, i.e. they will slip.

When such slippage occurs said corrugated side will slip before the smooth side because at least one pressure area of the corrugation side is smaller than a pressure area of the smooth side. When such an occurrence is repeated under working conditions, it can be understood that the corrugations, can cause wear or damage to themselves or the component they are in contact with. Slippage of the smooth side does not generally cause wear. Current practice includes installations where the material receiving the corrugations is soft enough to allow the corrugations to indent and grip the material, however it can be seen that this is not a preferred solution for all conditions or long term performance.

The foregoing issue relating to the slippage of the corrugated side of the tolerance ring relative to the cylindrical component it contacts, can be the primary cause of limited function at low values of spring force or friction.

A further limitation is that said tolerance-ring assemblies can be limited to one predetermined working torque-slip value which may be set by design and manufacture so adjustment, wear, design change and other factors can be difficult or impossible to remedy.

Extensive current research has discovered little knowledge about how tolerance rings function at low torque and torque-slip values and no systems that deal with the problems above.

The present invention provides a range of durable, inexpensive devices that provide fixed adjustable, and variable torque limiters, that increase the versatility and function of tolerance rings and provide a range of durable, inexpensive fixed, variable adjustable, and active limited-slip differentials, thus there is a need for the present invention.

The Figures

FIG. 1 shows an externally corrugated tolerance ring in exploded perspective view in a common prior art assembly. Showing, externally corrugated tolerance ring 1, external cylindrical component 2, internal cylindrical component 3. It is understood that when the torque limit of this assembly is exceeded either the, external cylindrical component 2, or the internal cylindrical component 3, will slip relative to the other and the corrugations of externally corrugated tolerance ring 1, will slip against, external cylindrical component 2, causing damage and rapid degradation of its predetermined torque value.

Figure 2:
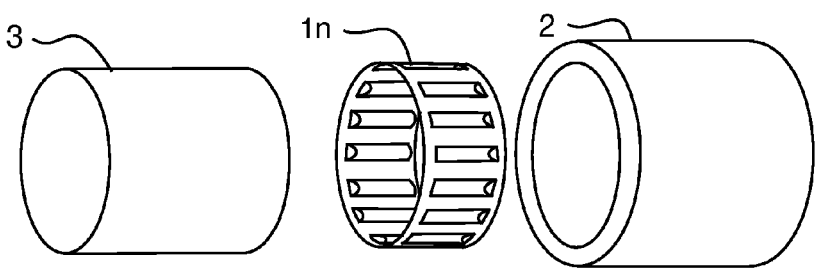
FIG. 2 shows an internally corrugated tolerance ring in exploded perspective view relating to a prior art assembly.

FIG. 2 shows an internally corrugated tolerance ring in exploded perspective view in a common prior art assembly. Showing, internally corrugated tolerance ring 1n, external cylindrical component 2, internal cylindrical component 3. It is understood that when the torque limit of this assembly is exceeded either the, external cylindrical component 2, or the internal cylindrical component 3, will slip relative to the other and the corrugations of internally corrugated tolerance ring 1n, will slip against, internal cylindrical component 3, causing damage and rapid degradation of its predetermined torque value.

Figure 3:
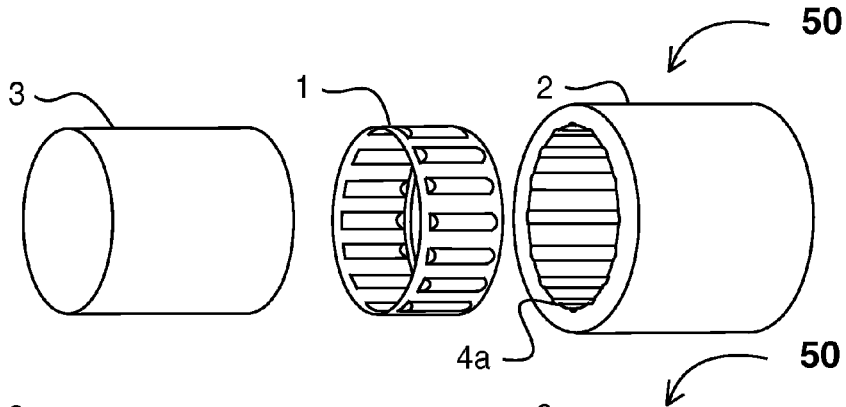
FIG. 3 shows an externally corrugated tolerance ring in an assembly in exploded perspective view relating to the present invention

FIG. 3 shows an externally corrugated tolerance ring in an assembly in exploded perspective view relating to the present invention. Showing, preferred embodiment 50 of the present invention, externally corrugated tolerance ring 1, external cylindrical component 2, internal cylindrical component 3, constant value axial groove 4a. It is understood that when the torque limit of this assembly is exceeded either the, external cylindrical component 2, or the internal cylindrical component 3, will slip relative to the other. However as there is means to mechanically lock the corrugations of, externally corrugated tolerance ring 1, to external cylindrical component 2, by one or more corrugation in, constant value axial groove 4a, the desired internal cylindrical component 3, can slip and externally corrugated tolerance ring 1, will remain mechanically locked to, external cylindrical component 2, thus providing a torque limiting assembly that is durable, simple and inexpensive.

Figure 4:
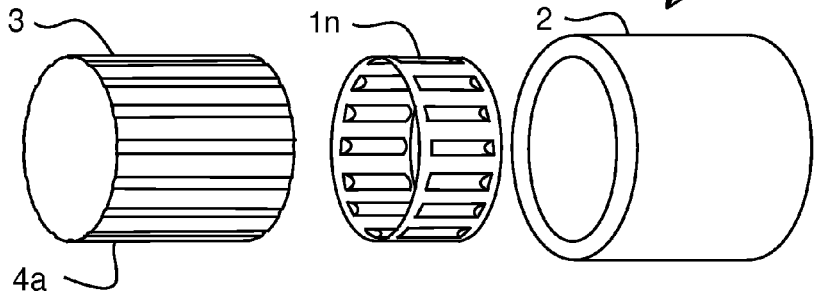
FIG. 4 shows an internally corrugated tolerance ring in an assembly in exploded perspective view relating to the present invention.

FIG. 4 shows an internally corrugated tolerance ring in an assembly in exploded perspective view relating to the present invention. Showing, internally corrugated tolerance ring 1n, external cylindrical component 2, internal cylindrical component 3, constant value axial groove 4a. As preceding principles apply it is understood that when the torque limit of this assembly is exceeded either the, external cylindrical component 2, or the internal cylindrical component 3. will slip relative to the other.

It is understood that there are many ways to mechanically lock or limit a tolerance ring, using keys, dowels, pins and other methods, without limitation. Those in the art can understand that the foregoing configuration is exemplary in nature and without limitation. Said constant value axial groove 4a, of a predetermined depth and design, can be cut into the interior bore of a housing or exterior surface of a shaft, by broaching, CNC or additive manufacturing or other processes known to the art, without limitation. The principles of the present invention also apply to any type of material or configuration of externally or internally corrugated tolerance ring, and its components, rotating in either direction without limitation. Preferably the principles of FIGS. 4, and 5 are applicable to all configurations, forms, materials of tolerance rings without limitation.

With a means to mechanically lock the corrugation side of said ring to its desired component damage can be prevented and the reliability and versatility of tolerance ring assemblies can be improved. For example the present invention provides a system that allows for a durable and very wide range of torque transfer and slip values which will be explained further in the teachings.

Figure 5:
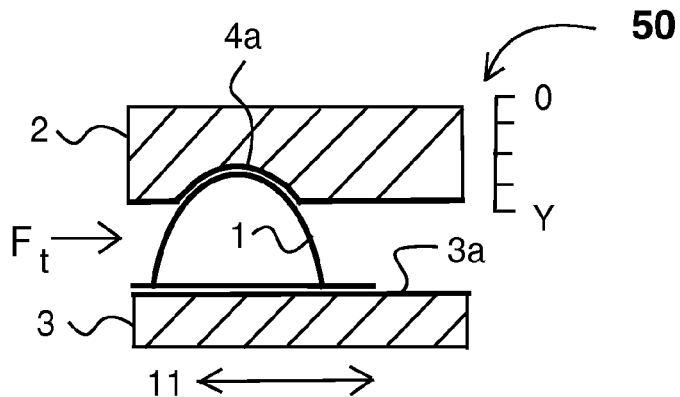
FIG. 5 shows a fractional sectional schematic view of one corrugation of an externally corrugated tolerance ring of a fixed value torque limiter.

FIG. 5, 6, 7, show a fractional sectional schematic and two graphs of a fixed value torque limiter, preferred embodiment

50 of the present invention, relating to function, installed and working torque-slip value Additionally, FIG. 5 introduces force Ft, which is a force tangential to internal cylindrical component surface 3a of internal cylindrical component 3. Preferably, force Ft is generated by internal cylindrical component 3, as a result of it being driven by a prime mover, in which internal cylindrical component surface 3a, of internal cylindrical component 3, slippingly-pushes on externally corrugated tolerance ring 1, under relative angular acceleration, in either rotational direction, which is constrained by constant value axial groove 4a.

Because force Ft is a vector force directed tangentially to internal cylindrical component surface 3a, of internal cylindrical component 3, of a force tangential to internal cylindrical component surface 3a, of internal cylindrical component cross-section 3; it translates to a torque equal to Ft times the radius of a force tangential to internal cylindrical component surface 3a of internal cylindrical component 3.

FIG. 5 shows a fractional sectional schematic view of one corrugation of an externally corrugated tolerance ring of a fixed value torque limiter. Showing, externally corrugated tolerance ring 1, external cylindrical component 2, constant value axial groove 4a, internal cylindrical component 3, internal cylindrical component surface 3a, introducing, compression value scale 0-Y, corresponding to compression of, externally corrugated tolerance ring 1, direction of rotation 11, and force Ft.

Explaining FIG. 5, preferably constant-value axial groove 4a, which provides a predetermined fixed constant torque-slip value under changing angular acceleration. As angular acceleration of the internal cylindrical component 3, increases or decreases, externally corrugated tolerance ring 1, can maintain its constant torque-slip value because as compression cannot change neither can torque-slip value. Externally corrugated tolerance ring is mechanically locked by the placement of the corrugation in the groove. Preferably preferred embodiment 50 can function as a device providing a constant value of torque slip in under all rotational conditions in either rotational direction.

Figure 6:
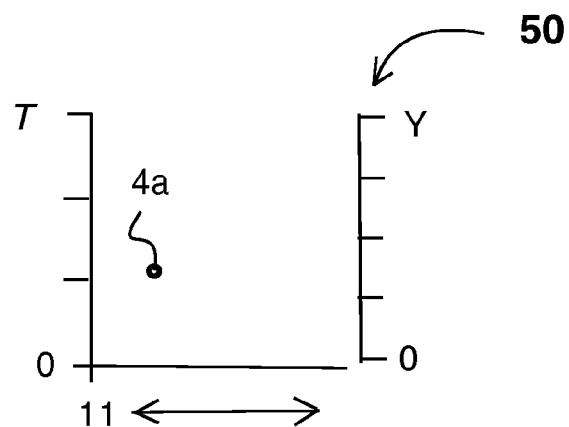
FIG. 6 shows a graph, relating to the performance envelope of a fixed value torque limiter.

FIG. 6 shows a graph, relating to the performance envelope of a fixed value torque limiter. Said graph directly relates to FIG. 5. Introducing torque value scale 0-T, showing torque-slip value that relates to compression; compression value scale 0-Y, corresponding to compression of, externally corrugated tolerance ring 1, not shown, direction of rotation 11.

Explaining FIG. 6, preferably, constant-value axial groove 4a shows a constant torque-slip and compression value, which cannot change as angular acceleration of the internal cylindrical component increases or decreases, because compression cannot change. The event is described by the following relationship: at 4a force Ft equals force 4a. These relative parameters are critical to performance of torque limiting systems described herein—for the reasons explained herein.

As externally corrugated tolerance ring 1, is mechanically locked by constant value axial groove 4a, to external cylindrical component 2, it can reliably transmit fixed predetermined installed torque-slip values from zero to the maximum elastic value of externally corrugated tolerance ring 1, under continuous working conditions without changes caused by variations of angular acceleration or loss of mechanical grip. Preferably this embodiment is particularly beneficial when a wide possibility of fixed constant predetermined torque-slip values are required and a tolerance ring is required to durably function under fixed value continuous torque-slip working conditions.

It is known to the art that the mechanical forces holding a tolerance rings corrugations in axial groove 4a, can be greater than the tangential force or angular acceleration of internal cylindrical component 3; therefore the relationship can be, mechanical force mf is greater than tangential force Ft. Notably axial groove 4a, can allow externally corrugated tolerance ring 1, to function reliably at a much wider and previously unavailable range of torque-slip values because spring force and or friction is not required to prevent unwanted relative rotation.

Figure 7:
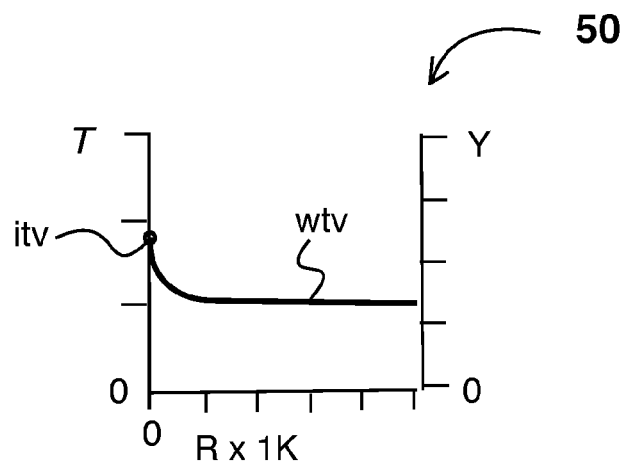
FIG. 7 shows a graph, relating to the installed and working torque values of a fixed value torque limiter.

FIG. 7 shows a graph, relating to the installed and working torque values of a fixed value torque limiter. Additionally FIG. 7 introduces and explains how torque-slip values produced by a tolerance ring change with use over time and introduces the notions of installed torque value, itv, the torque value of externally corrugated tolerance ring 1, when first installed in an assembly and working torque value, wtv, the torque value of externally corrugated tolerance ring 1, after a seating period and their respective relationships.

Showing torque value scale 0-T, compression value scale 0-Y, introducing scale rx1k, showing revolutions of internal cylindrical component 3, in increments of one thousand.

Regarding FIG. 7, showing a line relating to changes in torque-slip values. Particularly, FIG. 7 shows torque-slip and compression values beginning at installed torque value itv, decreasing to working torque value wtv. Showing that after reaching its working torque-slip value, a tolerance ring performing in preferred embodiment 50 can provide a very constant and reliable working torque-slip value under continuous working conditions.

In testing it has been found that, for a lubricated test fixture which simulates the function of a limited-slip differential or torque-limiting device, the installed torque value decreases substantially during the first 1,000 rotations. As an example: installed torque value itv is 38 ft-lbs and working torque value wtv is 28 ft-lbs at approximately 1 k revolutions. The average drop between installed and working torque values in this example is about 25%. Thus, this shows the criticality of configurations and relative dimensions of torque limiting systems described herein—for the reasons explained herein.

Thus, this test shows that a tolerance ring used in a similar installation and cycled for many thousands of revolutions can provide very consistent and reliable working torque value wtv. Those in the art understand that the foregoing research, configurations and descriptions are exemplary in nature and are without limitation.

Thus, FIG. 5. 6. 7. schematic and graphs explain how a system to mechanically lock one or more corrugations of a tolerance ring, by constant value axial groove 4a, provides a torque limiting device that can simply and reliably provide a predetermined fixed constant and reliable working torque-slip value.

It is understood that there are many ways to mechanically lock or limit a tolerance ring, using keys, dowels, pins and other methods, without limitation. Those in the art can understand that the foregoing configuration is exemplary in nature and without limitation. Said constant value axial groove 4a, of a predetermined depth and design, can be cut into the interior bore of a housing or exterior surface of a shaft, by broaching, CNC or additive manufacturing or other processes known to the art, without limitation. The principles of the present invention also apply to any type of material or configuration of externally or internally corrugated tolerance ring, and its components, rotating in either direction without limitation. Preferably the principles of FIG. 5, 6, 7, are applicable to all configurations, forms, materials of tolerance rings without limitation.

Figure 8:
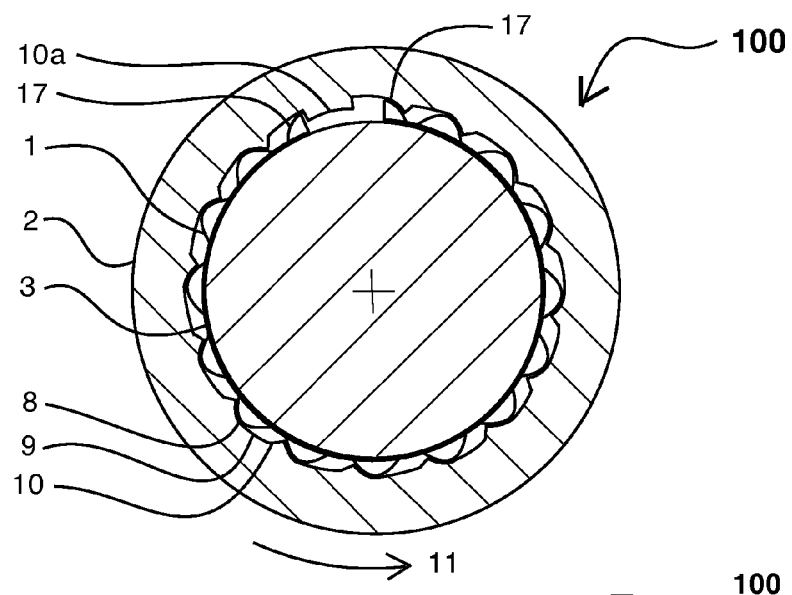
FIG. 8 shows an annular fractional cross-sectional view of a complete variable value by reaction to angular acceleration torque limiting assembly.

FIG. 8, 9, 10, show annular fractional cross-sectional and a perspective view of a variable value by reaction to angular acceleration torque limiting assembly.

FIG. 8 shows an annular fractional cross-sectional view of a complete variable value by reaction to angular acceleration torque limiting assembly. Comprising, externally corrugated tolerance ring 1, external cylindrical component 2, internal cylindrical component 3, minimum value mechanical down ramp stop 8, down ramp 9, maximum value mechanical down ramp stop 10, master mechanical corrugation stop 10a, and at each end of externally corrugated tolerance ring 1, and one or more corrugation end stop 17, direction of rotation 11—showing a preferred direction of rotation of internal cylindrical component 2.

Explaining FIG. 8, it shows preferred embodiment 100 that provides a predetermined constant minimum torque-slip value at minimum value mechanical down ramp stop 8 under normal rotational conditions. As angular acceleration of internal cylindrical component 3 increases, preferably externally corrugated tolerance ring 1 is driven "down" down ramp 9 into decreasing clearance between down ramp 9, and internal cylindrical component 3, thus causing an increase in torque-slip value.

Thus preferably compression and torque increase until the corrugations reach maximum value mechanical down ramp stop 10, at which point the torque-slip threshold is reached. Should angular acceleration continue, preferably preferred embodiment 100 functions as a torque limiter thereby providing a predetermined maximum torque-slip value. Preferably because down ramp 9, has a self-releasing profile and because angular acceleration ceases or becomes negative, externally corrugated tolerance ring 1, returns to minimum value mechanical down ramp stop 8, and minimum torque-slip value. Should internal cylindrical component 3, rotate in reverse direction, not shown, preferred embodiment 100 will produce the same predetermined minimum torque-slip value as is produced at minimum value mechanical down ramp stop 8 under normal relative rotational conditions Preferably one or more corrugation end stop 17, are located at opposite ends of externally corrugated tolerance ring 1, and can limit maximum compression and maximum torque-transfer (predetermined maximum torque-slip value) to a predetermined range. These relative parameters are critical to performance of torque limiting systems described herein—for the reasons explained herein.

Figure 9:
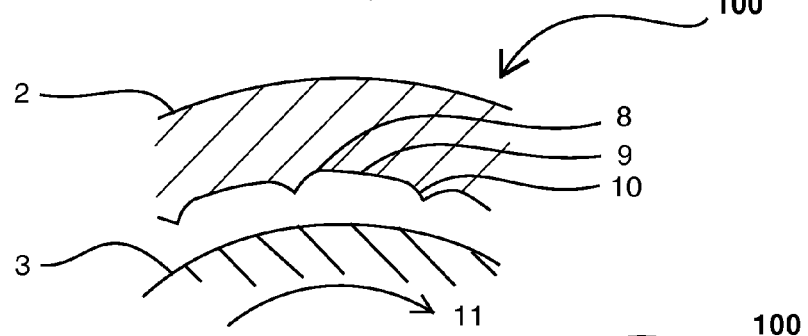
FIG. 9 shows a close-up annular fractional cross-sectional view of a variable value by reaction to angular acceleration torque limiter, without a tolerance ring.

FIG. 9 shows a close-up annular fractional cross-sectional view of a variable value by reaction to angular acceleration torque limiter, without a tolerance ring. Showing close-up of FIG. 8 without externally corrugated tolerance ring 1. This view more clearly shows down ramp 9. Also, preferably this view shows external cylindrical component 2, internal cylindrical component 3, minimum value mechanical down ramp stop 8, down ramp 9, and maximum value mechanical down ramp stop 10; with direction of rotation 11.

Figure 10:
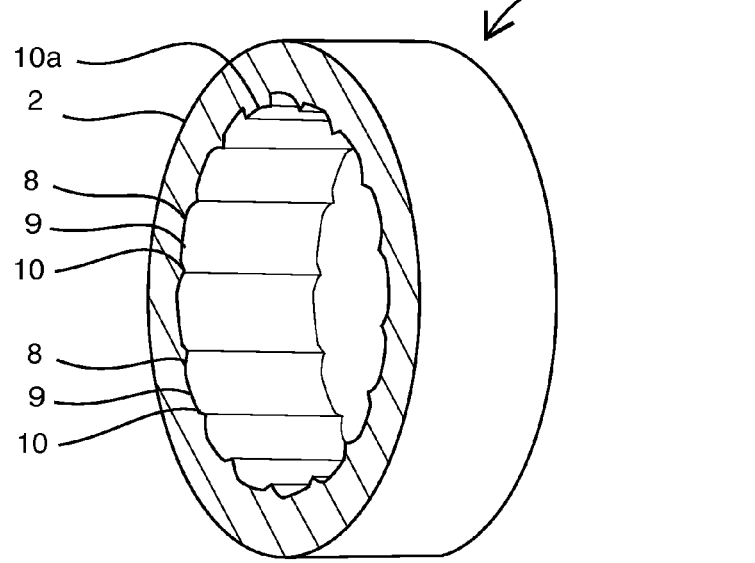
FIG. 10 shows a perspective view of the external cylindrical component of a variable value by reaction to angular acceleration torque limiter, without a tolerance ring and the internal cylindrical component.

FIG. 10 shows a perspective view of the external cylindrical component of a variable value by reaction to angular acceleration torque limiter, without a tolerance ring and the internal cylindrical component. Showing a perspective view of, external cylindrical component 2, of FIG. 8 by itself, with, external cylindrical component 2, minimum value mechanical down ramp stop 8, down ramp 9, maximum value mechanical down ramp stop 10, master mechanical corrugation stop 10a.

It is understood by those in the art that there is unlimited variation of characteristics of minimum value mechanical down ramp stop 8, down ramp 9, and maximum value mechanical down ramp stop 10 and their relationships which can include but are not limited to: long or short, linear or, convex or concave curvatures, gradual or abrupt and of lesser or greater compression.

Preferably embodiment 100 of the present invention is designed to rotate in a counter clockwise direction only, as the profile of the down ramps only allow compression in one direction. Alternatively, preferably, the present invention 100 can be configured to provide torque-slip in either counter clockwise or clockwise but not both rotational directions.

Preferably both external cylindrical component 2 and internal cylindrical component 3 are structured and arranged for rotating in the same angular direction and slippingly-coupled relative to each other. Preferably, these components are structured and arranged in a device such as a differential between a power source and a road wheel of a land vehicle. Preferably, these components are structured and arranged such that angular acceleration can manifest itself as a sudden increased rotational speed, or as a tangential force impulse.

Preferably externally corrugated tolerance ring 1, is structured and arranged in a housing bore and around a corresponding shaft; or in a groove in a housing bore and around a corresponding shaft; or in a housing bore and in a groove around a shaft; or a combination of these preferred arrangements, without limitation. Elements of preferred embodiment 100 can be lubricated by any means known to the art.

As stated this configuration of the present invention provides variable torque-slip values in one direction only and provides a fixed constant torque-slip value in the other direction, which can be forward and reverse in relation to a land vehicle or other driven device.

Additionally, preferably, embodiment 100 can be configured with internally corrugated tolerance ring 1a, (not shown) without limitation, because preceding principles apply.

Figure 11:
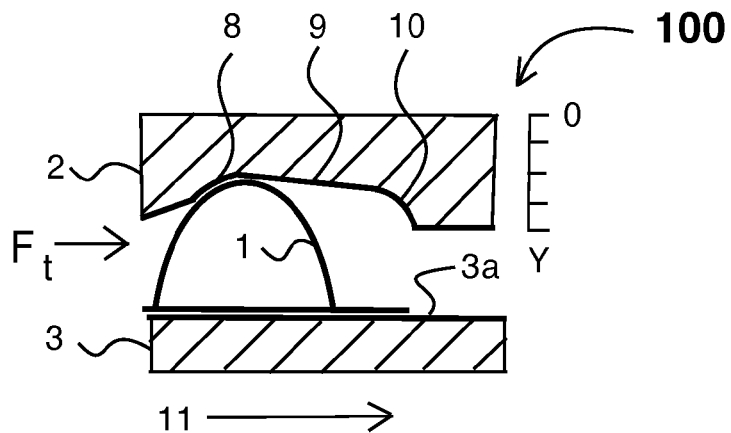
FIG. 11 shows a fractional sectional schematic view of one corrugation of an externally corrugated tolerance ring of a variable by reaction to angular acceleration torque limiter.

FIG. 11, 12, 13, show a fractional sectional schematic and two graphs, relating to function, installed and working torque-slip value of a variable value by angular acceleration torque limiter, preferred embodiment 100 of the present invention.

FIG. 11 shows a fractional sectional schematic view of one corrugation of an externally corrugated tolerance ring of a variable by reaction to angular acceleration torque limiter.

Showing, externally corrugated tolerance ring 1, external cylindrical component 2, internal cylindrical component 3, internal cylindrical component surface 3a, minimum value mechanical down ramp stop 8, down ramp 9, maximum value mechanical down ramp stop 10, compression value scale 0-Y, and force Ft, showing, direction of rotation 11.

Explaining FIG. 11, preferably under normal relative rotational conditions, minimum value torque-slip output occurs at minimum value mechanical down ramp stop 8, which produces a predetermined minimum torque-slip value. As angular acceleration of internal cylindrical component 3 increases, externally corrugated tolerance ring 1 is driven into the decreasing clearances between external cylindrical component 2, internal cylindrical component 3, and internal cylindrical component surface 3a, in the direction of rotation 11, of down ramp 9. This action causes an increase in compression and torque-slip value. Thus, compression and torque are increased until externally corrugated tolerance ring 1 is pushed to maximum value mechanical down ramp stop 10, at which point the torque threshold is reached. Should angular acceleration continue, preferably the device functions as a torque limiter and provides a predetermined maximum torque-slip value. Preferably down ramp 9 has a self-releasing profile and, as angular acceleration decreases or becomes negative, externally corrugated tolerance ring 1 can return to its minimum value mechanical down ramp stop 8, and its normal predetermined constant minimum torque-slip value. Should internal cylindrical component 3, rotate in reverse direction, not shown, preferred embodiment 100 will produce the same predetermined minimum torque-slip value as is produced at minimum value mechanical down ramp stop 8 under normal relative rotational conditions.

Figure 12:
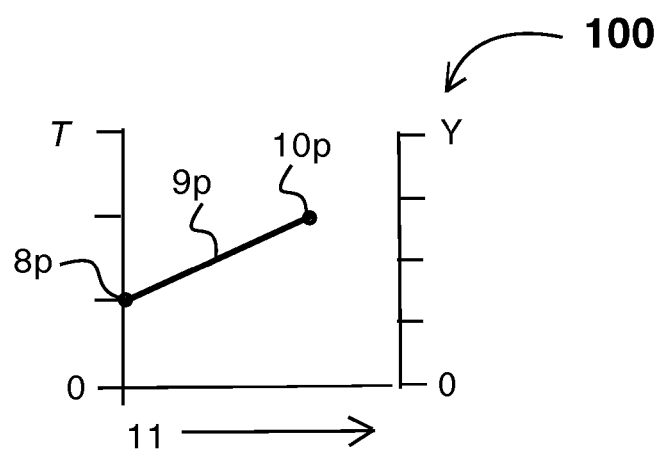
FIG. 12 shows a graph, relating to the performance envelope of a variable by reaction to angular acceleration torque limiter.

FIG. 12 shows a graph, relating to the performance envelope of a variable by reaction to angular acceleration torque limiter. FIG. 12 introduces a graph relating to preferred embodiment 100 of the present invention. The graph of FIG. 12 directly relates to FIG. 11 and introduces; point minimum value mechanical down ramp stop 8p, line down ramp 9p, point maximum value mechanical down ramp stop 10p, which directly correspond to; minimum value mechanical down ramp stop 8, down ramp 9, maximum value mechanical down ramp stop 10.

Showing torque value scale 0-T, compression value scale 0-Y, a line with; point minimum value mechanical down ramp stop 8p, line down ramp 9p, point maximum value mechanical down ramp stop 10p, direction of rotation 11.

Explaining FIG. 12, preferably it is understood that as relative angular acceleration increases and decreases the operating envelope of preferred embodiment 100 is defined by; point minimum value mechanical down ramp stop 8p, line down ramp 91, point maximum value mechanical down ramp stop 10p.

Regarding FIG. 12, the graph establishes the direct relationship between variations of compression and torque-slip value, showing how their increase and decrease are determined by the relative angular acceleration and deceleration of internal cylindrical component 3, and define the operating envelope of preferred embodiment 100. Preferably, this relationship is described by the following relationship: at minimum value mechanical down ramp stop 8, force Ft is less than or equal to F8; and at maximum value mechanical down ramp stop 10, force Ft is greater than or equal to F10. These relative parameters are critical to performance of torque limiting systems described herein—for the reasons explained herein.

Figure 13:
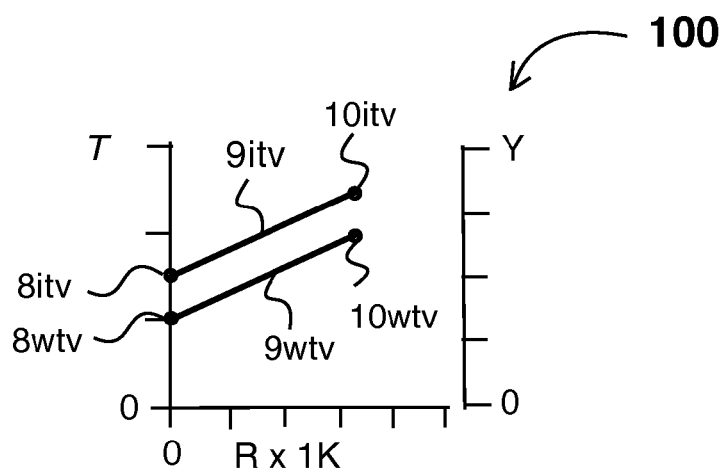
FIG. 13 shows a graph, relating to the installed and working torque values of a variable by reaction to angular acceleration torque limiter.

FIG. 13 shows a graph, relating to the installed and working torque values of a variable by reaction to angular acceleration torque limiter. Preferably, FIG. 13 comprises a graph directly relating to FIG. 11 showing torque value scale 0-T, compression value scale 0-Y, scale Rx1k. Introducing, minimum value mechanical down ramp stop installed torque value 8itv, minimum value mechanical down ramp stop working torque value 8wtv; relating to minimum value mechanical down ramp stop 8, line down ramp 9itv and line down ramp 9wtv, relating to down ramp 9; maximum value mechanical down ramp stop installed torque value 10itv, maximum value of mechanical down ramp stop installed torque value 10wtv, relating to maximum value down ramp stop 10. It is therefore understood that the installed and working torque value, minimum and maximum value mechanical down ramp stops and down ramps correspond to FIGS. 11 and 12 and the principles described herein.

Explaining FIG. 13, it shows two lines corresponding to installed and working torque value of preferred embodiment 100 and an installed torque value of externally corrugated tolerance ring 1 (not shown), at zero revolutions 8itv, 9itv, 10itv. As revolutions increase installed torque-slip value begins to drop to working torque-slip value, 8wtv, 9wtv, 10wtv, once working torque value is achieved, working torque value will continue with a very minimal loss of torque and compression for many thousands of revolutions. These relative parameters are critical to performance of torque limiting systems described herein—for the reasons explained herein.

Showing that preferred embodiment 100 can provide very consistent and reliable working torque-slip values. Those in the art understand that the foregoing research, configurations and descriptions are exemplary in nature and do not limit the scope of the present invention in any manner.

Those in the art can understand that the foregoing configuration is exemplary in nature and without limitation. Said, minimum value mechanical down ramp stop 8, down ramp 9, maximum value mechanical down ramp stop 10, of predetermined depth and design, can be cut into the interior bore of a housing or exterior surface of a shaft, by broaching, CNC or additive manufacturing or other processes known to the art, without limitation. The principles of the present invention also apply to any type of material or configuration of externally or internally corrugated tolerance ring, and its components, rotating in either direction without limitation. Preferably the principles of FIG. 11, 12, 13 are applicable to all configurations, forms, materials of tolerance rings without limitation.

Figure 14:
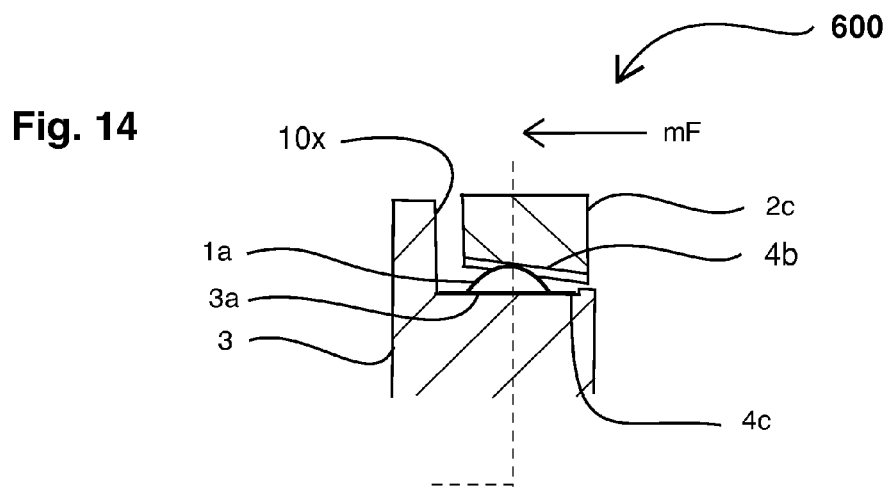
FIG. 14 shows a fractional axial sectional view of a variable by axial movement torque limiter.

FIG. 14, 15, 16, show fractional sectional views of preferred embodiment 600 utilizing the principles of preferred embodiment 100 of the present invention, which are adapted to provide compression and torque-slip from axial movement of the external cylindrical component.

Preferably preferred embodiment 600 utilizing preceding principles can provide a pre-calculated range of actively variable torques-slip values.

FIG. 14 shows a fractional axial sectional view of a torque limiter. Showing externally corrugated tolerance ring 1, external compression component 2c, internal cylindrical component 3, internal cylindrical component surface 3a, axial compression groove 4b, housing moving force mF, external compression component stop 10x, and axial holding groove 4c.

Explaining FIG. 14, it shows preferred embodiment 600 in a configuration that provides zero torque-slip under normal conditions. Axial compression groove 4b can engage one or more corrugations of externally corrugated tolerance ring 1, and as external compression component 2c is moved by housing moving force mF, the decreasing dimension between external compression component 2c, internal cylindrical component 3, and internal cylindrical component surface 3a, causes an increase in compression and torque-slip value.

Thus preferably compression and torque-slip increase until said external compression component 2c reaches external compression component stop 10x, at which point maximum desired torque-slip value is reached. Preferably preferred embodiment 600 then functions as a torque limiter, thereby providing a predetermined maximum torque-slip value. Preferably because axial compression groove 4a has a self-releasing profile and or because housing moving force mF ceases or becomes negative, torque-slip value returns to zero. Axial holding groove may mechanically limit unwanted axial movement of externally corrugated tolerance ring 1.

Figure 15:
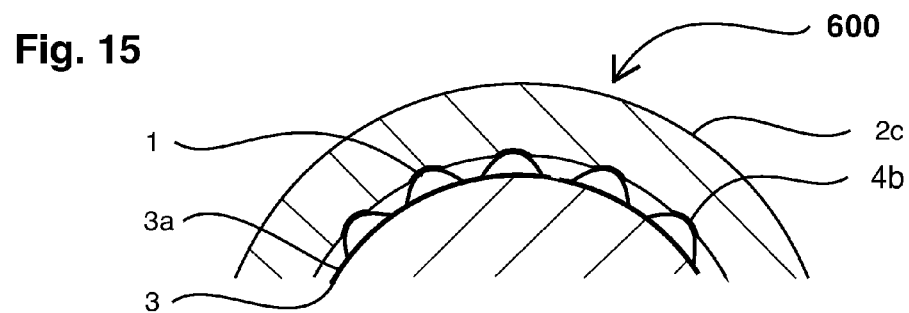
FIG. 15 shows an annular fractional sectional view of a variable by axial movement torque limiter.

FIG. 15 shows an annular fractional sectional view of a torque limiter. Showing a fractional cross sectional view of the above described embodiment 600 having; externally corrugated tolerance ring 1, external compression component 2c, internal cylindrical component 3, internal cylindrical component surface 3a, and axial compression groove 4b.

As preceding principles apply it is understood that preferred embodiment 600 can function within a range of predetermined torque-slip values without limitation. Preferably it is understood that moving force mF can originate from any source without limitation.

This embodiment can have a performance envelope similar to FIG. 11, 12, 13. Also preferably it is understood by those in the art that preferred embodiment 600 can be adapted to function with any of the applicable embodiments of the present invention without limitation.

Preferably it is understood by those in the art that the foregoing explanations are exemplary in nature, and are without limitation.

Figure 16:
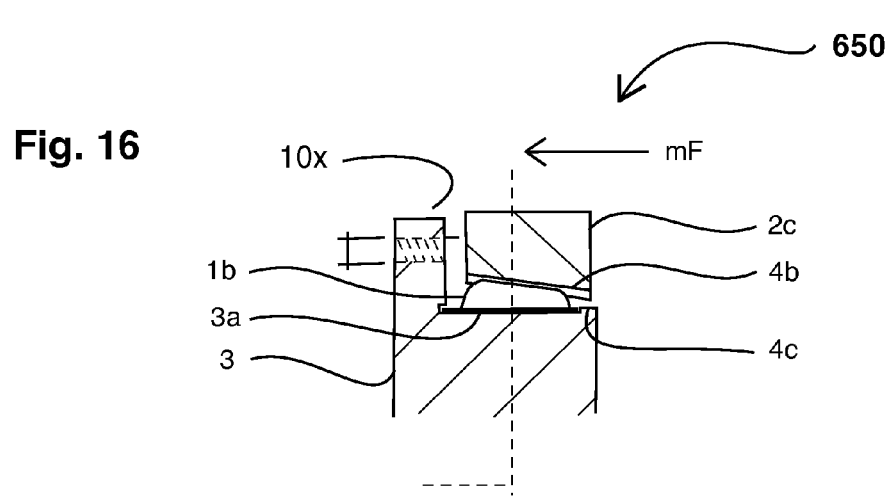
FIG. 16 shows a fractional axial sectional view of a variable by axial movement torque limiter.

FIG. 16 shows a fractional axial sectional view of a torque limiter. Showing angularly externally corrugated tolerance ring 1b, external compression component 2c, internal cylindrical component 3, internal cylindrical component surface 3a, axial compression groove 4b, housing moving force mF, external compression component stop 10x, and axial holding groove 4c.

Explaining FIG. 16, it shows preferred embodiment 600 in a configuration that provides zero torque-slip under normal conditions. Axial compression groove 4b can engage one or more corrugations of angularly externally corrugated tolerance ring 1b. As external compression component 2c is moved by housing moving force mF, the decreasing dimension between external compression component 2c, internal cylindrical component 3, and internal cylindrical component surface 3a, causes an increase in compression and torque-slip value.

Thus preferably compression and torque-slip increase until said external compression component 2c reaches external compression component stop 10x, at which point maximum desired torque-slip value is reached. Preferably preferred embodiment 600 then functions as a torque limiter, thereby providing a predetermined maximum torque-slip value. Preferably because axial compression groove 4a has a self-releasing profile and or because housing moving force mF ceases or becomes negative, torque-slip value returns to zero. Axial holding groove may mechanically limit unwanted axial movement of angularly externally corrugated tolerance ring 1.

Those in the art can understand that the foregoing configurations are exemplary in nature and without limitation. Said, axial compression groove 4b, of predetermined depth and design, can be cut into the interior bore of a housing or exterior surface of a shaft, by broaching, CNC or additive manufacturing or other processes known to the art, without limitation. The principles of the present invention also apply to any type of material or configuration of externally or internally corrugated tolerance ring, and its components, rotating in either direction without limitation. Preferably the principles of FIG. 14, 15, 16 are applicable to all configurations, forms, materials of tolerance rings without limitation.

FIG. 17, 18, 19, show a fractional sectional schematic and two graphs, relating to function, installed and working torque-slip value of a variable value by reaction to angular acceleration bi-directional torque limiter, preferred embodiment 150 of the present invention.

Additionally FIG. 17 shows a bi-directional variant of preferred embodiment 100, FIG. 14, whose function was described in detail preceding.

Introducing, maximum value negative mechanical down ramp stop −10, negative down ramp −9, minimum value equilibrium point eq, it is understood as preceding principles apply, these are the corresponding parts necessary to the function of preferred embodiment 150 to provide a bi-directional variable torque value by reaction to angular acceleration torque limiter.

Showing a fractional schematic of one corrugation of externally corrugated tolerance ring 1, external cylindrical component 2, internal cylindrical component 3, internal cylindrical component surface 3a, maximum value negative mechanical down ramp stop −10, negative down ramp −9, minimum value equilibrium point eq, down ramp 9, maximum value mechanical down ramp stop 10, compression scale 0-Y, and force Ft.

Additionally FIG. 5A relates the symmetrical linear bi-directional down ramp profile of down ramp −9 and down ramp 9 to a clearance between internal cylindrical component, internal cylindrical component surface 3a, internal cylindrical component 3, and external cylindrical component 2.

FIG. 17 shows a fractional sectional schematic view of one corrugation of an externally corrugated tolerance ring of a bi-directional, variable by reaction to angular acceleration torque limiter. Explaining FIG. 17, as preceding principals apply, preferably it is understood that preferred embodiment 150 can provide variable torque values by reaction to angular rotation in either rotational direction and minimum value equilibrium point eq describes the situation where relative rotation is zero. Furthermore the detailed explanations in the preceding discussion of FIGS. 14, 15, 16, apply—except in this preferred embodiment 150, force Ft and its associated rotational angular acceleration of internal cylindrical component 3 can be a bi-directional.

FIG. 18 shows a graph, relating to the performance envelope of a, bi-directional variable by reaction to angular acceleration torque limiter.

Showing torque value scale 0-T, compression value scale 0-Y, maximum negative value mechanical stop −10, negative down ramp −9, minimum value equilibrium point eq, down ramp 9, maximum value mechanical stop 10, showing direction of rotation 11.

Explaining FIG. 18, preferably it is understood that preferred embodiment 150 can function in either rotational direction and the detailed explanations in the preceding discussion of FIG. 14, 15, 16, apply—except in this preferred embodiment 150, force Ft and its associated rotational angular acceleration of internal cylindrical component 3 can be bi-directional. The event is described by the following relationship, at −10 force Ft is greater than or equal to F-10, at eq force Ft equals Feq, at maximum value mechanical down ramp stop 10, force Ft is greater than or equal to; F10. These relative parameters are critical to the performance of torque limiting systems described herein—for the reasons explained herein.

FIG. 19 shows a graph, relating to the installed and working torque values of a, bi-directional variable by reaction to angular acceleration torque limiter. Showing a graph that relates directly to FIG. 17. As the principles of the difference in installed torque-slip value and working torque-slip value have been described in detail preceding the graph will be briefly described.

Showing a graph with line, installed torque-slip value itv and line, working torque-slip value wtv which represent the differences in installed and working torque value relating to preferred embodiment 150 and that the difference in installed and long term working torque-slip values is approximately 25%. These relative parameters are critical to the performance of torque limiting systems described herein—for the reasons explained herein.

Showing that preferred embodiment 150 can provide a very consistent and reliable variable value by reaction to angular acceleration bi-directional torque limiter. Those in the art understand that the foregoing research, configurations and descriptions are exemplary in nature and are without limitation.

Those in the art can understand that the foregoing configuration is exemplary in nature and without limitation. Said, maximum negative value mechanical stop −10, negative down ramp −9, minimum value equilibrium point eq, down ramp 9, maximum value mechanical stop 10, of predetermined depth and design, can be cut into the interior bore of a housing or exterior surface of a shaft, by broaching, CNC or additive manufacturing or other processes known to the art, without limitation. The principles of the present invention also apply to any type of material or configuration of externally or internally corrugated tolerance ring, and its components, rotating in either direction without limitation. Preferably the principles of FIG. 17, 18, 19, are applicable to all configurations, forms, materials of tolerance rings without limitation.

Figure 20:
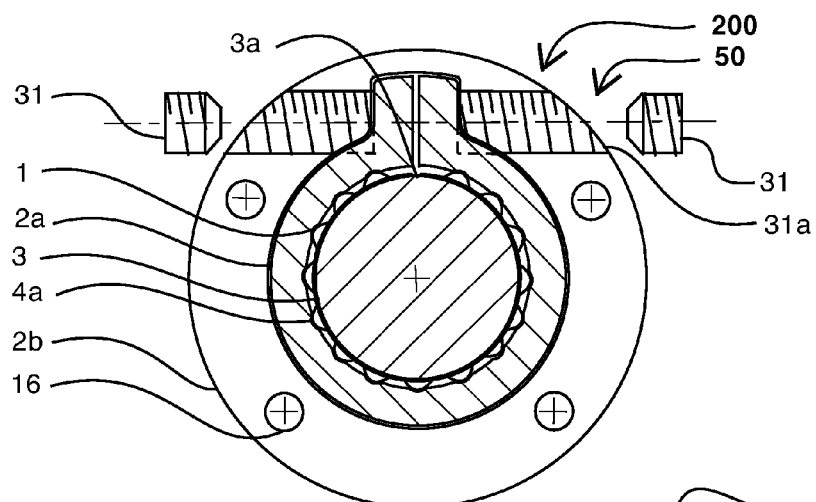
FIG. 20 shows a complete annular fractional cross-sectional view of a complete circumferentially adjustable value torque limiter.

FIG. 20, 21, 22, 23, 24, show, complete and partial sectional and fractional sectional views of a circumferentially adjustable-value torque limiter 200 utilizing preferred embodiment 50 of the present invention.

Further, FIG. 20, 21, 22, 23, 24, show preferred embodiment 200 of the present invention, a torque-limiting assembly with means of adjusting its internal circumference. This allows for adjusting the compression and torque-slip value of preferred embodiment 50, providing adjustability of the associated transferring torque to a desired device.

FIG. 20 shows a complete annular fractional cross-sectional view of a circumferentially adjustable value angular torque limiter. Comprising externally corrugated tolerance ring 1, external cylindrical component driving ring 2a, internal cylindrical component 3, internal cylindrical component surface 3a, one or more axial groove 4a, external cylindrical driving ring 2b, internal cylindrical component 3, direction of compression 11a, one or more holes 16, one or more adjusting screws 31, and one or more threaded hole 31a.

Explaining FIG. 20, axial groove 4a is parallel to the axis of rotation of a predetermined depth and design, which can be cut into the interior bore, by broaching, CNC or additive manufacturing or other processes known to the art, of external cylindrical component driving ring 2a, and adapted to drivingly engage one or more of corresponding external corrugations of the externally corrugated tolerance ring 1. Preferably external cylindrical component driving ring 2a, is of split ring configuration with one or more protruding ears, and is configured in such a manner that its diameter can be reduced by one or more adjusting screw 31, which cause a clamping force against the protruding ears, decreasing the internal circumference of external cylindrical component driving ring 2a.

Preferably external cylindrical component driving ring 2a can transfer torque through its flange or other means to the external cylindrical driving ring 2b, which preferably is mounted in a limited slip differential or industrial driveline by bolts, not shown, in one or more hole 16, without limitation.

Figure 21:
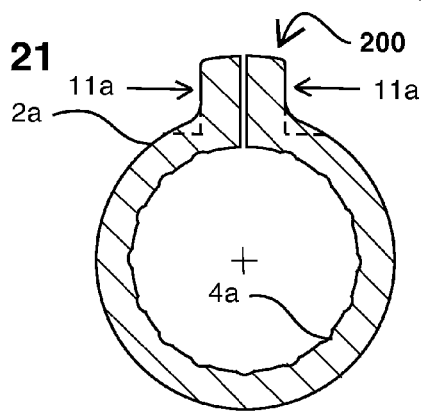
FIG. 21 shows an annular fractional cross-sectional view of the driving ring of the circumferentially adjustable value torque limiter.

FIG. 21 shows an annular fractional cross-sectional view of the driving ring of the circumferentially adjustable value torque limiter. Regarding FIG. 21, it shows external cylindrical component driving ring 2a, with axial groove 4a, corresponding to one or more corrugations of externally corrugated tolerance ring 1, not shown, arrows showing direction of compression 11a.

Figure 22:
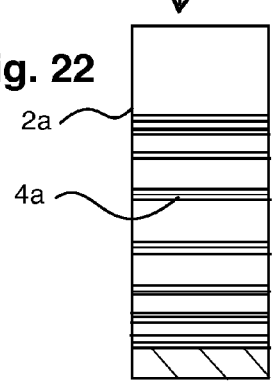
FIG. 22 shows an axial fractional cross-sectional view of the driving ring of the circumferentially adjustable value torque limiter.

FIG. 22 shows an axial fractional cross-sectional view of the driving ring of the circumferentially adjustable value torque limiter. Regarding FIG. 22, it shows an axial cross section of FIG. 2B1 with external cylindrical component driving ring 2a, having one or more axial groove 4a.

Figure 23:
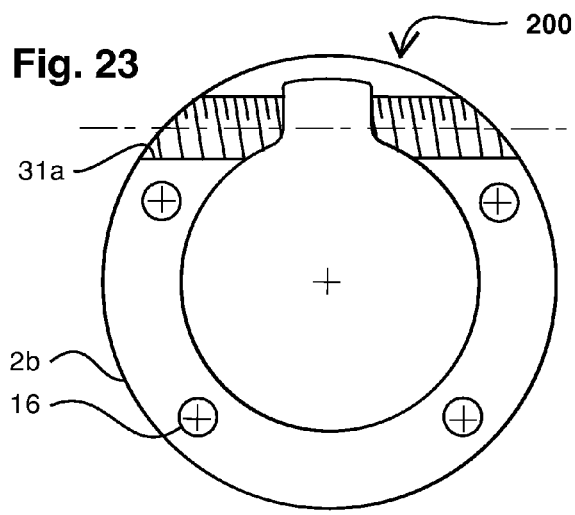
FIG. 23 shows an annular fractional cross-sectional view of the housing ring of the circumferentially adjustable value by torque limiter.

FIG. 23 shows an annular fractional cross-sectional view of the housing ring of the circumferentially adjustable value torque limiter. Regarding FIG. 23, it shows external cylindrical driving ring 2b, with threaded hole 31a, for adjusting screw 31, and one or more hole 16.

Figure 24:
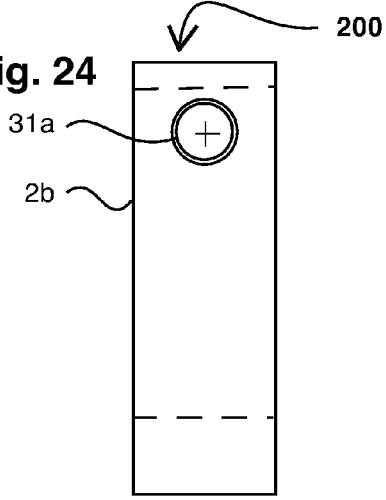
FIG. 24 shows an axial fractional cross-sectional view of the housing ring of the circumferentially adjustable value torque limiter.

FIG. 24 shows an axial fractional cross-sectional view of the housing ring of the circumferentially adjustable value torque limiter. Regarding FIG. 24 it shows an axial section of external cylindrical component driving ring 2b with threaded hole 31a.

Preferably by changing the internal circumferential diameter of external cylindrical component driving ring 2b, by the compression of adjusting screw 31, embodiment 200 provides adjustable torque slip values.

Preferably axial groove 4a, can closely conform to the contour of the compressed corrugations of a tolerance ring and be the depth of, but shall not be limited to, the thickness of the material of the ring used in its application. Thus for example: a ring made of 0.020 inch thick material can have a groove depth of 0.020 inch, and a ring made of 0.006 inch thick material can have a groove depth of 0.006 inch. These relative dimensions are critical to performance of torque limiting systems described herein—for the reasons explained herein. Said axial grooves can be made by CNC machining, additive manufacturing, molding, shaping, milling, or any process known to the art such without limitation and any part of FIG. 20, 21, 22, 23, 24, can be made of metal, plastic, composite or any material without limitation.

Preferably this preferred embodiment 200 of the present invention provides a very simple, inexpensive and reliable torque limiter with accurately adjustable torque-slip values that can compensate for different requirements, changing conditions or wear.

Preferably it is understood by those in the art that preferred embodiment 200 can be adapted to function with preferred embodiment 50 as shown above or with any relevant embodiment of the present invention. Additionally, preferably, embodiment 200 can be configured in many ways without limitation, including with an internally corrugated tolerance ring (not shown) because preceding principles apply.

Those in the art can understand that the foregoing configuration is exemplary in nature and without limitation. Said, constant value axial groove 4a, of predetermined depth and design, can be cut into the interior bore of external cylindrical component driving ring 2a, by broaching, CNC or additive manufacturing or other processes known to the art, without limitation. The principles of the present invention also apply to any type of material or configuration of externally or internally corrugated tolerance ring, and its components, rotating in either direction without limitation. Preferably the principles of FIG. 20, 21, 22, 23, 24 are applicable to all configurations, forms, materials of tolerance rings without limitation.

Figure 25:
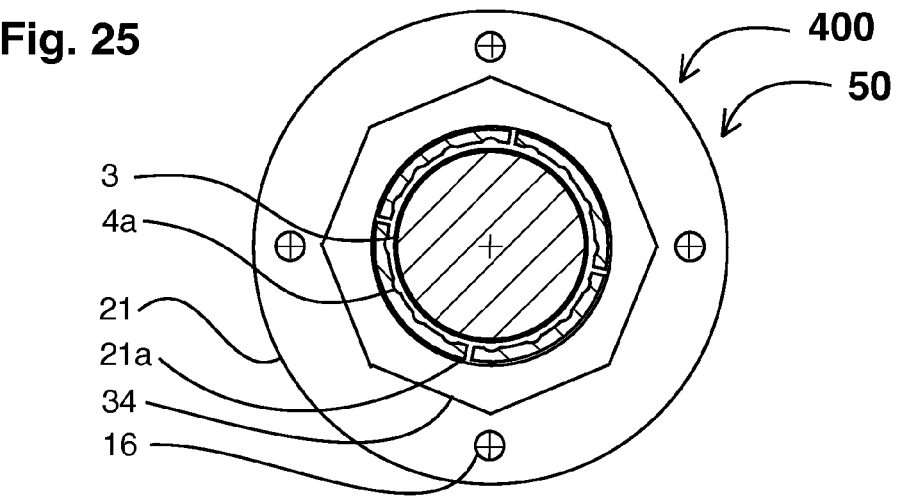
FIG. 25 shows an annular fractional sectional view of a taper bushing torque limiter.

FIG. 25, 26, 27, show a taper bushing torque limiter, preferred embodiment 400 of the present invention an adjustable value torque limiter utilizing preferred embodiment 50.

Showing FIG. 25, 26 27, one type, known to the art, of a compressive type taper bushing, which further on can be known as an taper bushing, which can be configured to connect a power source to a shaft, a pulley to a shaft and or other configurations without limitation. Preferably said taper bushings can have means to reduce their interior circumferential diameter by compression, or expand their outer circumferential diameter by expansion, not shown, and can have a means to transfer torque. Preferably said a taper bushings can be used by the present invention to accurately control compression and thus torque slip and can transfer torque. Preferably it is understood that FIG. 25, 26, 27, are exemplary and can represent any type of taper bushing or device with means to expand internally or externally on an internal or external component and a means transfer torque and thus, with any type or configuration, without limitation.

FIG. 25, 26, 27, preferably shows fractional sectional views of said adjustable bushing which can also function as a torque-slip assembly in accordance with a preferred embodiment 400 of the present invention.

Preferably said adjustable bushings can use bolts, split rings and tapered collars to effect compression, on their internal pressure rings, further on it is further explained how compression is achieved and torque is transferred.

FIG. 25 shows an annular fractional sectional view of a taper bushing torque limiter. Showing, internal cylindrical component 3, axial groove 4a, split-tapered threaded housing 21, housing slot 21a, pressure nut 34, hole 16, externally corrugated tolerance ring 1, not shown.

Figure 26:
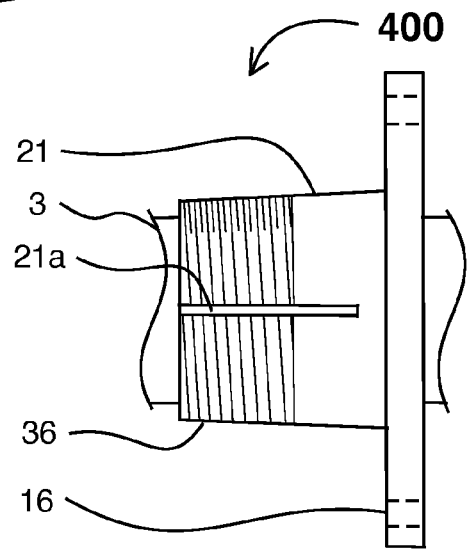
FIG. 26 shows an orthogonal view of a the housing of the taper bushing torque limiter.

FIG. 26 shows an orthogonal view of a the housing of a taper bushing torque limiter. Showing, split tapered threaded housing 21, internal cylindrical component 3, housing slot 21a, tapered threads 36, and hole 16.

Figure 27:
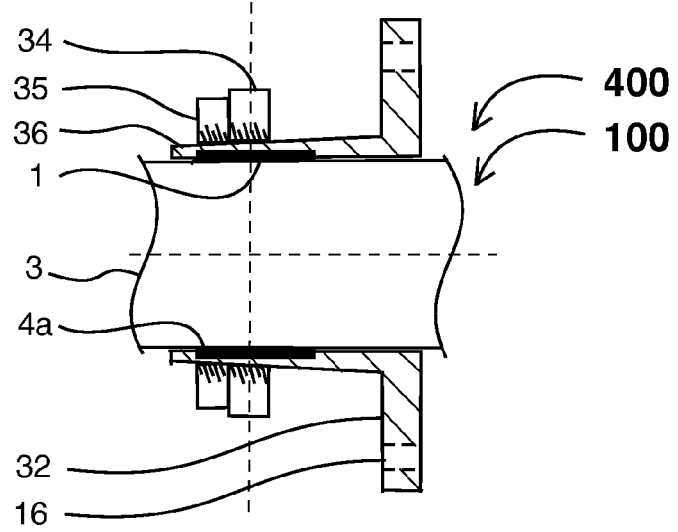
FIG. 27 shows an axial fractional sectional view of a the housing of a taper bushing torque limiter.

FIG. 27 shows an axial fractional sectional view of a the housing of a taper bushing torque limiter. Showing, pressure nut 34; lock nut 35, tapered threads 36, externally corrugated tolerance ring 1, internal cylindrical component 3, axial groove 4a, split-tapered housing 21, and hole 16.

Explaining FIGS. 25, 26, 27, preferably split-tapered housing 21 is circumferentially compressed by the action of compression nut 34, thus decreasing its interior diameter. Preferably compression on said externally corrugated tolerance ring 1 can be increased or decreased by the action of said compression nut 34, and thus its torque-slip value controlled. Preferably split-tapered housing 21 can transfer torque slip from internal cylindrical component 3, which can be a shaft driven by a power source, through its flange 12. Said flange, which may have other configurations without limitation, can be mounted in a differential or industrial driveline by bolts in one or more hole 16, or in other devices or configurations without limitation.

It is understood by those in the art that said compressive taper bushing can be adapted to function with any of the applicable embodiments of the present invention without limitation.

Preferably it is understood by those in the art that the foregoing explanations are exemplary in nature, and are without limitation. Those in the art can understand that the foregoing configuration is exemplary in nature and without limitation. Said constant value axial groove 4a, of a predetermined depth and design, can be cut into the interior bore of a housing or exterior surface of a shaft, by broaching, CNC or additive manufacturing or other processes known to the art, without limitation. The principles of the present invention also apply to any type of material or configuration of externally or internally corrugated tolerance ring, and its components, rotating in either direction without limitation.

Preferably the principles of FIG. 25, 26, 27, are applicable to all configurations, forms, materials of tolerance rings without limitation.

Preferably preferred embodiment 400 of the present invention provides a very simple, inexpensive and reliable torque limiter with accurately adjustable torque-slip values that can compensate for changing requirements, conditions or wear.

Figure 28:
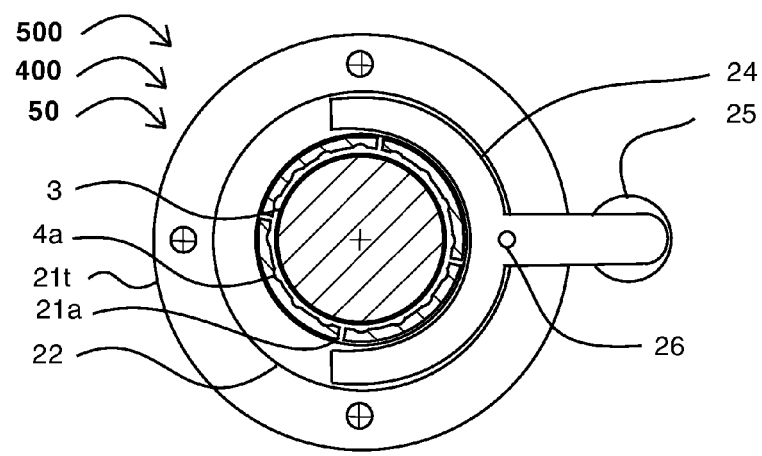
FIG. 28 shows a sectional view of an actively variable torque limiter.

FIG. 28, 29, 30, show sectional views of an actively variable torque limiter. Preferred embodiment 500 using a variant of preferred embodiment 400 and fixed value torque limiter preferred embodiment 50. Said embodiments provide an active system that can be adapted to many industrial and automotive devices including limited-slip differentials.

FIG. 28 shows a sectional view of an actively variable torque limiter. Showing internal cylindrical component 3, axial groove 4a, split-tapered smooth housing 21s, housing slot 21a, pressure bearing 22, actuator arm 24, actuator 25, actuator arm pivot 26, externally corrugated tolerance ring 1, not shown.

Figure 29:
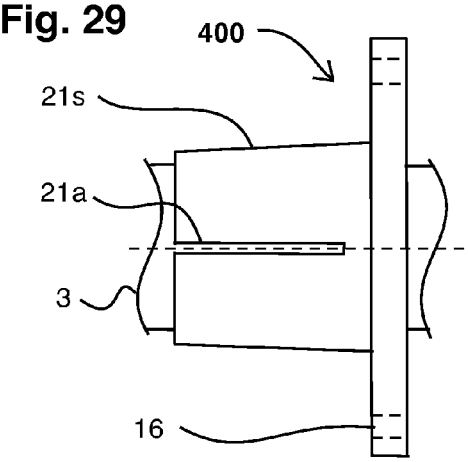
FIG. 29 shows an orthogonal view of the actively variable torque limiter.

FIG. 29 shows an orthogonal view of an actively variable torque limiter. Showing split tapered smooth housing 21s, housing slot 21a, internal cylindrical component 3, and hole 16.

Figure 30:
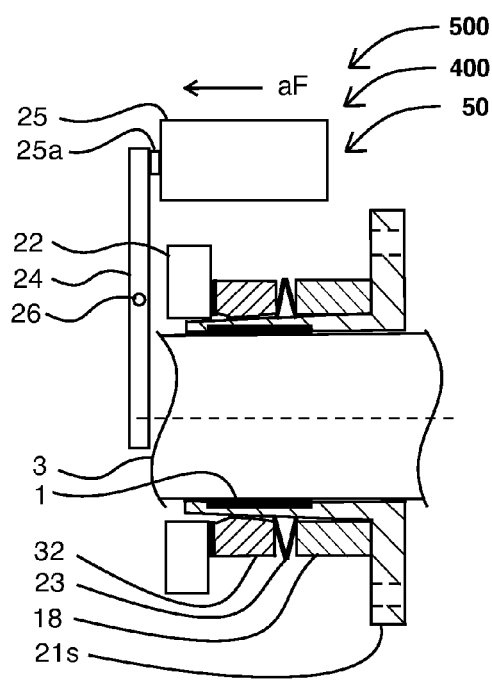
FIG. 30 shows a sectional view of the actively variable torque limiter.

FIG. 30 shows a sectional view of an actively variable torque limiter. Showing actuator 25; actuator piston 25a, actuator force aF, pressure bearing 22, actuator arm 24, actuator arm pivot 26, internal cylindrical component 3, externally corrugated tolerance ring 1, pressure collar 32, Belleville washer group 23, spacer collar 18, split-tapered smooth housing 21s.

Explaining FIG. 28, 29, 30, Under normal conditions preferred embodiment 500 can provide a predetermined frictional torque value. When increased frictional torque is needed or unwanted differentiation is detected, preferably by a signal from a ECU or mechanical controlling device, a hydraulic pump or other device, not shown, can create actuator force aF. Actuator piston 25a, moved by actuator force aF, preferably moves actuator arm 24, which pivots on actuator arm pivot 26, and moves pressure bearing 22, which can be similar in configuration to an automobile clutch throwout bearing, which moves pressure collar 32, which can have a self-releasing tapered inner surface, against the tapered outer surface of split-tapered smooth housing 21s, thus decreasing the inner circumferential diameter of split-tapered housing 21s. This increases compression on externally corrugated tolerance ring 1. When actuator force aF ceases, Belleville washer group 23, provides force to self-releasing taper of pressure collar 32 returning preferred embodiment 500 to its predetermined frictional torque. This embodiment can have a performance envelope similar to FIG. 14, 15, 16 and may be lubricated by any means known to the art without limitation.

Additionally preferably it is known that as preceding principles apply and preferred embodiment 500 provides a pre-calculated range of actively variable torques-slip values; and when properly configured can provide an active limited slip differential. Preferably said active system can have means to provide actuator force aF, without limitation.

Also preferably it can provide power transfer in land vehicles without limitation. Also preferably it is understood by those in the art that preferred embodiment 500 can be adapted to function with any of the applicable embodiments of the present invention without limitation.

Those in the art can understand that the foregoing configuration is exemplary in nature and without limitation. Said constant value axial groove 4a, of a predetermined depth and design, can be cut into the interior bore of a housing or exterior surface of a shaft, by broaching, CNC or additive manufacturing or other processes known to the art, without limitation. The principles of the present invention also apply to any type of material or configuration of externally or internally corrugated tolerance ring, and its components, rotating in either direction without limitation. Preferably the principles of FIG. 28, 29, 30, are applicable to all configurations, forms, materials of tolerance rings without limitation.

Figure 31:
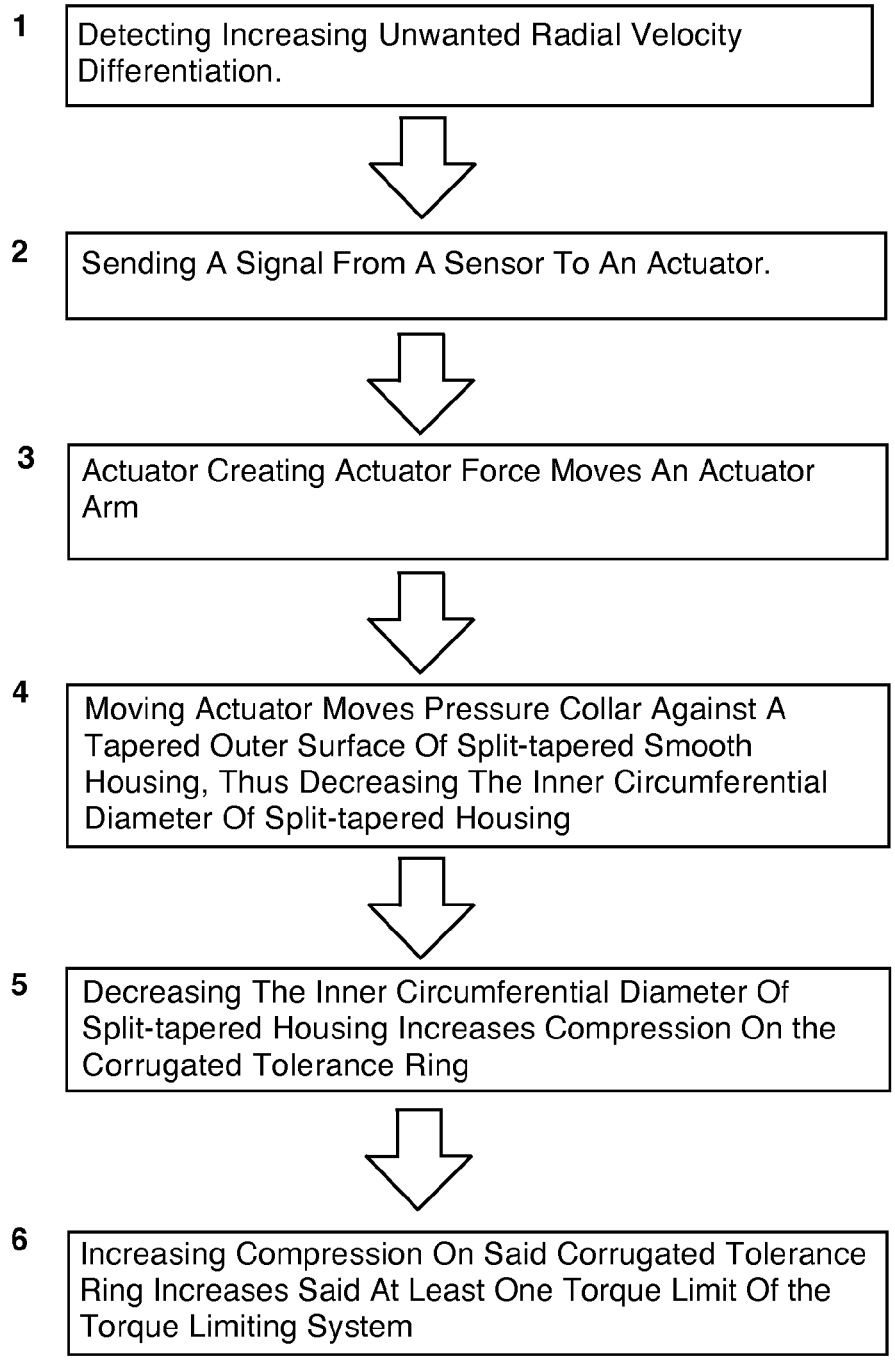
FIG. 31 shows a block diagram of the function of the actively variable torque limiter.

FIG. 31 shows a block diagram of the function of the actively variable torque limiter, FIG. 28, 29, 30.

1. Detecting Increasing unwanted radial velocity differentiation
2. Sending a signal from a sensor to an actuator
3. Actuator creating actuator force moves an actuator arm
4. Moving actuator moves pressure collar against a tapered outer surface of split-tapered smooth housing, thus decreasing the inner circumferential diameter of split-tapered housing.
5. Decreasing the inner circumferential diameter of split-tapered housing increases compression on the corrugated tolerance ring.
6. Increasing compression on said corrugated tolerance ring increases said at least one torque limit of the torque limiting system.

Figure 32:
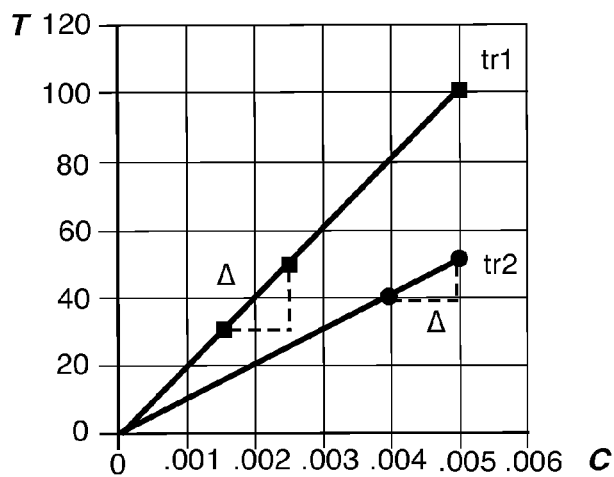
FIG. 32 shows a graph relating to the relationships among tolerance ring height, compression, ring stiffness, and sensitivity to wear.

FIG. 32, 33, 34, show three graphs relating to the relationships between tolerance ring height, compression, ring stiffness, and sensitivity to wear. Here, tr1, tr2, and tr3 represent installed torque-slip values of externally corrugated tolerance rings.

FIG. 32 shows a graph relating to the relationships among tolerance ring height, compression, ring stiffness, and sensitivity to wear. Showing two lines tr1, tr2. Here, tr1 and tr2 are externally corrugated tolerance rings with uncompressed corrugation heights of 0.050 inch, and are arranged in identical devices with different diametral clearances. Under related test conditions, tr1 produced 100 ft-lbs at 10% or 0.005 inch compression, tr2 produces 50 ft-lbs at 10% or 0.005 inch compression. Therefore, tr1 is considered to be twice as stiff as tr2. Thus, these results show the criticality of configurations and relative dimensions of torque limiting systems described herein—for the reasons explained herein.

When tr1 is installed in a device with a diametral clearance such that it produces a torque-slip value of 50 ft-lbs (at 0.0025 inch compression), it is considered to be near its upper limit of elasticity. In this case, 0.001 inch of wear results in a 40% loss in torque-slip value. (tr1 delta=(50−30)/50×100=40%). Thus, these results show the criticality of configurations and relative dimensions of torque limiting systems described herein—for the reasons explained herein.

When tr2 is installed in a device with a diametral clearance such that it produces a torque-slip value of 50 ft-lbs (0.005 inch compression), 0.001 inch of wear results in a 20% loss in torque-slip value. (tr2 delta=(50−40)/50×100=20%). Thus, these results show the criticality of configurations and relative dimensions of torque limiting systems described herein—for the reasons explained herein.

In this example the same amount of wear (0.001 inch) results in double the loss in torque-slip for tr1 as for tr2. Therefore it is preferable to select a tolerance ring whose installed torque-slip value is at or near its upper limit of elasticity.

Figure 33:
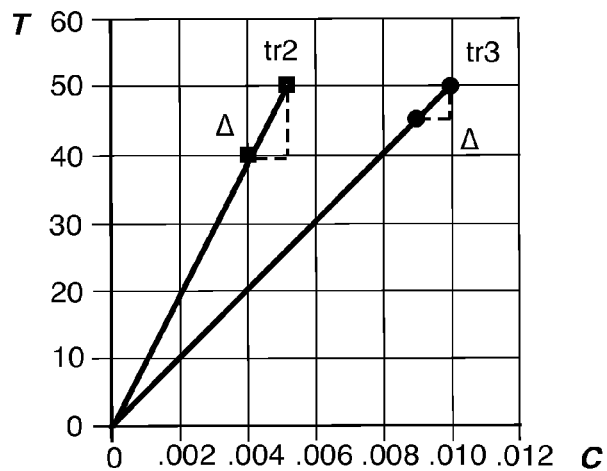
FIG. 33 shows a graph relating to the relationships among tolerance ring height, compression, ring stiffness, and sensitivity to wear.

FIG. 33 shows a graph relating to the relationships among tolerance ring height, compression, ring stiffness, and sensitivity to wear. Showing a graph with two lines tr2, and tr3. Here, tr2 can be an externally corrugated tolerance ring, with an uncompressed corrugation height of 0.050 inch, and tr3 can be an externally corrugated tolerance ring with an uncompressed corrugation height of 0.100 inch. They are identical devices excepting their different diametral clearances. These relative parameters are critical to performance of torque limiting systems described herein—for the reasons explained herein.

Related testing of tr2 produced 50 ft-lbs at 10% or 0.005 inch compression; and tr3 produced 50 ft-lbs at 10% or 0.010 inch compression. When tr2 is installed in a device with a diametral clearance such that it produces a torque-slip value of 50 ft-lbs (at 0.0025 inch compression), 0.001 inch of wear results in a 20% loss of torque-slip value (tr2 delta=(50−40)/50×100=20%). When tr3 is installed in a device with a diametral clearance such that it produces a torque-slip value of 50 ft-lbs (0.010 inch compression), 0.001 inch of wear results in a 10% loss of torque-slip value, (tr3 delta=(50−45)/50×100=10%). In this example the same amount of wear (0.001 inch) results in double the loss of torque-slip for tr2 as for tr3. Therefore it is preferable to select a tolerance ring with the greatest possible corrugation height. Thus, these results show the criticality of configurations and relative dimensions of torque limiting systems described herein—for the reasons explained herein.

Figure 34:
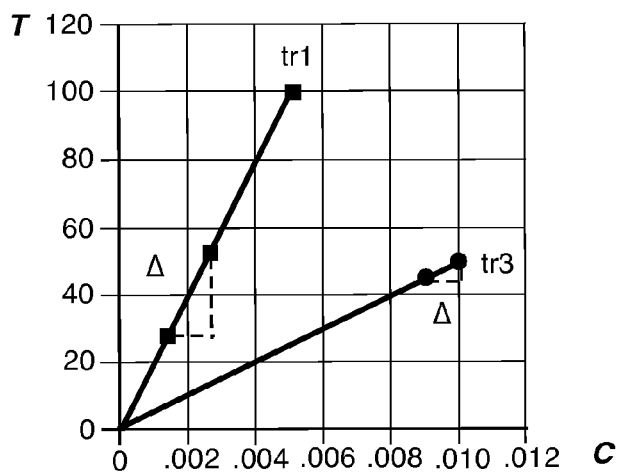
FIG. 34 shows a graph relating to the relationships among tolerance ring height, compression, ring stiffness, and sensitivity to wear.

FIG. 34 shows a graph relating to the relationships among tolerance ring height, compression, ring stiffness, and sensitivity to wear. Showing a graph with two lines tr1, tr3. Here, tr1 is an externally corrugated tolerance ring, with uncompressed corrugation height of 0.50 inch, and tr3 is an externally corrugated tolerance ring with compression height of 0.100 inch—and are identical devices with except for their different diametral clearances. In this example we are comparing ring tr1 from FIG. 1A and ring tr3 from FIG. 1B. Here, tr1 produces 100 ft-lbs at 10% or 0.005 inch compression. tr3 produces 50 ft-lbs at 10% or 0.010 inch compression. Thus, these results show the criticality of configurations and relative dimensions of torque limiting systems described herein—for the reasons explained herein.

When tr1 is installed in a device with a diametral clearance such that it produces a torque-slip value of 50 ft-lbs (at 0.0025 inch compression), it is considered to be near its upper limit of elasticity. In this case, 0.001 inch of wear results in a 40% loss of torque-slip value (tr1 delta=(50−30)/50×100=40%). Thus, these results show the criticality of configurations and relative dimensions of torque limiting systems described herein—for the reasons explained herein.

When tr3 is installed in a device with a diametral clearance such that it produces a torque-slip value of 50 ft-lbs (0.010 inch compression), 0.001 inch of wear results in a 10% loss of torque-slip value (tr3 delta=(50−45)/50×100=10%). In this example the same amount of wear (0.001 inch) results in four times the loss of torque-slip for tr1 as for tr3. Thus, these results show the criticality of configurations and relative dimensions of torque limiting systems described herein—for the reasons explained herein.

Therefore both the beneficial effects of Examples 1 and 2 are additive. It is preferable to select a tolerance ring whose installed torque-slip value is at or near its upper limit of elasticity, and it is also preferable that said tolerance ring also have the greatest possible corrugation height.

Thus, these results show the criticality of configurations and relative dimensions of torque limiting systems described herein—for the reasons explained herein.

Figure 35:
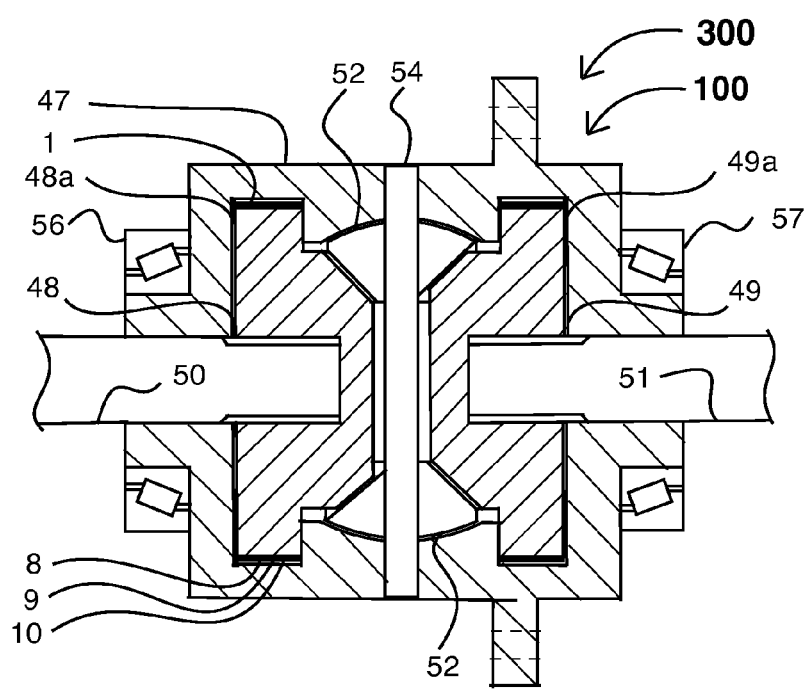
FIG. 35 shows an annular fractional sectional view of a limited-slip differential with a variable value by reaction to angular acceleration internal frictional device.

FIG. 35 shows an annular fractional sectional view of a limited-slip differential with a variable value by reaction to angular acceleration internal frictional device.

FIG. 35, shows preferred embodiment 300 of the present invention, a limited-slip differential utilizing preferred embodiment 100, as a frictional device internal to the differential. Specifically this embodiment, efficiently and inexpensively provides a limited-slip differential with a very minimal addition to size, complexity, expense or weight.

Preferred embodiment 300 can be adapted to many types of devices and vehicles and can be placed in any relevant, power transferring position such as, front wheel drive differential, all wheel drive center differential, rear wheel drive rear axle, or in any relevant land vehicle without limitation.

The function of preferred embodiment 100 has been described in detail in preceding FIG. 8, 9, 10, 11, 12, 13, 14, 15, 16, and can provide a predetermined constant minimum torque-slip value under normal road going conditions, which allows easy differentiation. An increasing torque-slip value during angular acceleration; to provide a higher torque-slip value and increased motive power to the vehicle, should a loss of traction situation occur. A fixed maximum torque-slip value should angular acceleration continue. A decreasing torque-slip value, returning to the constant minimum torque-slip value as angular acceleration ceases or becomes negative, and a fixed constant minimum torque-sip value in the reverse direction. All of which limits unwanted differentiation and provides traction under adverse conditions.

Further, describing FIG. 35, it shows a fractional sectional view of a limited slip differential motor vehicle differential. Preferably, differential housing 47, is securely mounted to an axle or transaxle housing (not shown) and can be in a motor vehicle. Preferably, differential housing 47, is adapted to rotate in response to rotational torque received from a prime mover and a drive train; not shown, a first side bearing 56, side bearing cap not shown, and a second side bearing 57, side bearing cap not shown, externally corrugated tolerance ring 1, minimum value mechanical down ramp stop 8, down ramp 9, maximum value mechanical down ramp stop 10.

Preferably, first side gear 48, is positioned in differential housing 47, first side gear 48, is rotationally fixed to first output shaft 50 and second side gear 49 is positioned in differential housing 47. Preferably, second side gear 49 is rotationally fixed to a second output shaft 51, one, or more, differential pinion gear 52, on pinion shaft 54, securely fixed to differential housing 47. Preferably said pinion gears are positioned intermediate to first side gear 48, and second side gear 49, permitting differentiation.

Preferably, first side gear 48 and second side gear 49 are fashioned to have a frictional area of increased circumferential diameter and area first side gear frictional area 48a and second side gear frictional area 49a. As is known to the art, increased circumferential diameter and area provide an increased amount of torque-slip, with decreased wear characteristics, as the pressure area is larger.

Preferably externally corrugated tolerance ring 1, one or more, can be positioned in each frictional area, which is between first side gear 48, second side gear 49, and differential housing 47. Thus externally corrugated tolerance ring 1, is positioned circumferentially around first side gear 48, and between differential housing 47, and another externally corrugated tolerance ring 1, positioned circumferentially around said second side gear 49, and between said differential housing 47.

Preferably preferred embodiment 300 can relate directly to preferred embodiment 100 of the present invention. Also preferably it is understood that preferred embodiment 300 can be adapted to function with any of the applicable embodiments of the present invention without limitation.

Those in the art can understand that the foregoing configuration is exemplary in nature and without limitation. Said preferred embodiment 100 with, minimum value mechanical down ramp stop 8, down ramp 9, maximum value mechanical down ramp stop 10, of a predetermined depth and design, can be cut into the interior bore of a housing or exterior surface of a shaft, by broaching, CNC or additive manufacturing or other processes known to the art, without limitation. The principles of the present invention also apply to any type of material or configuration of externally or internally corrugated tolerance ring, and its components, rotating in either direction without limitation. Also preferably it can provide power transfer in land vehicles without limitation.

Preferably it is understood by those in the art that the foregoing explanations are exemplary in nature, and do not limit the scope of the present invention in any way.

LISTING OF ELEMENTS

| | |
|---|---|
| 40 | preferred embodiment 40 fixed value tq limiter screw, key, pin, stop not used |
| 50 | preferred embodiment 50 fixed value tq lmt |
| 100 | preferred embodiment 100 uni-variable V tq lmt |
| 150 | preferred embodiment 150 bi-variable V tq lmt |
| 200 | preferred embodiment 200 E-Ring with 50, 100, and 150. |
| 300 | preferred embodiment 300 LSD with 100 |
| 400 | preferred embodiment 400 taper bushing with 50 |
| 500 | preferred embodiment 500 active with 50 |
| 600 | preferred embodiment 600 active syncro w/axial |
| 1 | externally corrugated tr |
| 1n | internally corrugated tr |
| 1a | ext corg tr spherical |
| 1b | ext corg tr angle |
| 2 | external cylindrical comp |
| 2a | ext/cyl/comp/driving ring |
| 2b | housing ring |
| 2c | external compression comp |
| 3 | internal cylindrical comp |
| 3a | int cyl compnt surface |
| 4a | const V axial groove |
| 4b | const V axial ramp |
| 4c | axial holding groove |
| 8 | min V mech down ramp stop |
| −8 | min V neg down ramp stop |
| 8itv | installed tq V |
| 8wtv | working tq V |
| 9 | down ramp |
| −9 | negative down ramp |
| 9itv | installed tq V |
| 9wtv | working tq V |
| 10 | max V mech down ramp stop |
| −10 | max V neg down ramp stop |
| 10itv | installed tq V |
| 10wtv | working tq V |
| 10a | housing corrugation stop |
| 10b | housing |
| 11 | direct of rotation |
| 11a | direct of comp arrow |
| 11b | actuator force |
| 16 | hole |
| 17 | corrugation Stop |
| 18 | spacer collar |
| 21 | split-tapered threaded housing |

-continued

| | |
|---|---|
| 21a | housing slot |
| 21s | split tapered smooth housing |
| 22 | Pressure Bearing |
| 23 | Belleville washer group |
| 24 | actuator Arm |
| 25 | actuator |
| 25a | actuator piston |
| 26 | actuator arm pivot |
| 31 | adjusting screw |
| 31a | threaded hole |
| 32 | Pressure collar |
| 34 | pressure nut |
| 35 | lock nut |
| 36 | tapered threads |
| 47 | differential housing |
| 48 | first side gear |
| 48a | first side gear frictional area |
| 49 | second side gear |
| 49a | second side gear frictional area |
| 50 | first output shaft |
| 51 | second output shaft |
| 52 | differential pinion gear |
| 54 | pinion shaft |
| 56 | side bearing |
| 57 | side bearing |
| eq | min V equilib point |
| 10wtv | min V M d r work Tq V |
| Ft | tangential force |
| tr1 | tol r 1 in FIG. 6 |
| tr2 | tol r 2 in FIG. 6 |
| tr3 | tol r 3 in FIG. 6 |
| itv | installed-torque value |
| wtv | working-torque value |
| O-T | torque value scale |
| O-Y | compression value scale |
| rx1k | scale |
| 8itv | min V m d r inst Tq V |
| 8wtv | min V m d r work Tq V |
| 9itv | d r inst Tq V |
| 9wtv | d r work Tq V |
| 10itv | min V M d r inst Tq V |

What is claimed is:

1. A torque limiting assembly, comprising:
a center element defined by a circular cross-section and an outer wall;
an intermediate ring element encircling said center element within a central bore formed therein, said intermediate ring element defined by a generally circular cross-section and an inner wall and an outer wall;
an exterior element encircling said intermediate ring element within a generally circular bore formed in said exterior element, said bore defined by an inner wall and said exterior element further defined by an outer wall; and
wherein said center, intermediate and exterior elements are a matched set selected from a group defined by an inner splined set and an outer splined set,
said inner splined set comprising:
the center element outer wall is defined by a plurality of longitudinal grooves in spaced relation around its periphery;
the intermediate element inner wall is defined by a plurality of domes protruding therefrom, said domes configured to reside within said longitudinal grooves in said center element outer wall; and
the exterior element inner wall is defined by a smooth surface, and said outer splined set comprising:
the center element outer wall is defined by a smooth surface;
the intermediate element outer wall is defined by a plurality of domes protruding therefrom in spaced relation around its periphery; and
the exterior element inner wall is defined by a plurality of longitudinal grooves configured such that said domes protruding from said intermediate element outer wall reside within them.

2. The torque limiting assembly of claim 1, wherein at least one said longitudinal groove comprises:
first and second longitudinal sidewalls extending up from the opposing edges of said groove and terminating in first and second stop portions, said first and second longitudinal sidewalls defining relatively unequal heights; a top wall extending between said stop portions.

3. The torque limiting assembly of claim 2, wherein:
said exterior element further comprises at least one longitudinal gap defining a width, said gap extending between said inner wall and said outer wall;
said torque limiting assembly further comprises a gap adjustment mechanism for changing each said gap width.

4. The torque limiting assembly of claim 3, wherein said gap adjustment mechanism comprises:
an encapsulating ring encircling said exterior element; and
one or more adjustment screws, with each threadedly engaging a threaded bore formed within said encapsulating ring, whereby said one or more adjustment screw can be rotated to add or reduce compressive force on said exterior element to responsively reduce or expand said gap width.

5. The torque limiting assembly of claim 3, wherein said gap adjustment mechanism comprises:
said exterior element defining a longitudinally-oriented conically-shaped outer wall further defined by threads formed therein; and
one or more threaded nuts engaging said outer wall threads, whereby rotating at least one of said threaded nuts will add or reduce compressive force against said outer wall and responsively reduce or expand said gap width.

6. The torque limiting assembly of claim 3, wherein said gap adjustment mechanism comprises:
said exterior element defining a longitudinally-oriented conically-shaped outer wall;
one or more collar rings engaging said exterior element outer wall; and an actuator arm configured to urge one or more of said collar rings longitudinally along said conically-shaped outer wall to add or reduce compressive force against said outer wall to responsively reduce or expand said gap width.

7. The torque limiting assembly of claim 1, wherein at least one said longitudinal groove comprises:
first and second longitudinal sidewalls extending up from the opposing edges of said groove and terminating in first and second stop portions;
a top wall extending between said stop portions, wherein said top wall defines a generally arcuate shape wherein a midpoint defined by said top wall defines a greater distance from a line interconnecting said opposing edges than does the distance between a said stop portion and a said edge at least one of said sidewalls.

8. The torque limiting assembly of claim 7, wherein said top wall is defined by a flat ramp portion extending from each of said stop portions, said ramp portions intersecting with one another at said midpoint.

9. The torque limiting assembly of claim 1, wherein said exterior elements inner wall defines a surface that is sloped along a transverse direction, said transverse direction oriented perpendicular to said longitudinal direction.

10. The torque limiting assembly of claim 9, wherein said domes define an elongate shape orientated along said transverse direction.

11. An improved torque ring assembly, comprising:
a center element defined by an outer wall;
an intermediate ring element surrounding said center element within a central bore formed therein, said intermediate ring element defined by an inner wall and an outer wall;
an exterior element surrounding said intermediate ring element within a bore formed in said exterior element, said bore defined by an inner wall and said exterior element further defined by an outer wall; and
wherein said center, intermediate and exterior elements are a matched set selected from a group defined by an inner grooved set and an outer grooved set,
said inner grooved set comprising:
the center element outer wall is defined by a plurality of longitudinal grooves in spaced relation around its periphery;
the intermediate element inner wall is defined by a plurality of domes protruding therefrom, said domes configured to reside within said longitudinal grooves in said center element outer wall, and further defined by a generally teardrop-shaped cross-section; and
the exterior element inner wall is defined by a smooth surface, and said outer grooved set comprising:
the center element outer wall is defined by a smooth surface;
the intermediate element outer wall is defined by a plurality of domes protruding therefrom in spaced relation around its periphery, said domes further defined by a generally teardrop-shaped cross-section; and
the exterior element inner wall is defined by a plurality of longitudinal grooves configured such that said domes protruding from said intermediate element outer wall reside within them.

12. The torque ring assembly of claim 11, wherein said exterior elements inner wall defines a surface that is sloped along a transverse direction, said transverse direction oriented perpendicular to said longitudinal direction.

13. The torque ring assembly of claim 12, wherein said domes define an elongate shape orientated along said transverse direction.

14. The torque ring assembly of claim 11, wherein at least one said longitudinal groove comprises:
first and second longitudinal sidewalls extending up from the opposing edges of said groove and terminating in first and second stop portions, said first and second longitudinal sidewalls defining relatively unequal heights;
a top wall extending between said stop portions; and
wherein said exterior element further comprises at least one longitudinal gap defining a width, said gap extending between said inner wall and said outer wall;
said torque ring assembly further comprises a gap adjustment mechanism for changing each said gap width.

15. The torque ring assembly of claim 14, wherein said gap adjustment mechanism comprises:
said exterior element defining a longitudinally-oriented conically-shaped outer wall further defined by threads formed therein; and
one or more threaded nuts engaging said outer wall threads, whereby rotating at least one of said threaded nuts will add or reduce compressive force against said outer wall and responsively reduce or expand said gap width.

16. The torque ring assembly of claim 15, wherein said gap adjustment mechanism comprises:
an encapsulating ring encircling said exterior element; and
one or more adjustment screws, with each threadedly engaging a threaded bore formed within said encapsulating ring, whereby said one or more adjustment screw can be rotated to add or reduce compressive force on said exterior element to responsively reduce or expand said gap width.

17. The torque ring assembly of claim 14, wherein said gap adjustment mechanism comprises:
said exterior element defining a longitudinally-oriented conically-shaped outer wall;
one or more collar rings engaging said exterior element outer wall; and
an actuator element to urge one or more of said collar rings longitudinally along said conically-shaped outer wall to add or reduce compressive force against said outer wall to responsively reduce or expand said gap width.

* * * * *